(12) United States Patent
Rose

(10) Patent No.: US 7,809,646 B2
(45) Date of Patent: *Oct. 5, 2010

(54) MONITORING OF COMPUTER-RELATED RESOURCES AND ASSOCIATED METHODS AND SYSTEMS FOR ALLOCATING AND DISBURSING COMPENSATION

(75) Inventor: Anthony Rose, London (GB)

(73) Assignee: Brilliant Digital Entertainment, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,613

(22) Filed: Mar. 22, 2010

(65) Prior Publication Data

US 2010/0174782 A1      Jul. 8, 2010

Related U.S. Application Data

(63) Continuation of application No. 10/720,835, filed on Nov. 24, 2003, now Pat. No. 7,729,992.

(60) Provisional application No. 60/478,523, filed on Jun. 13, 2003.

(51) Int. Cl.
*G06F 21/00* (2006.01)
(52) U.S. Cl. ............... 705/51; 705/8; 705/78; 705/14; 705/7; 709/229; 709/234; 709/225; 709/226; 726/10; 713/155
(58) Field of Classification Search ............ 726/10
See application file for complete search history.

(56) References Cited

U.S. PATENT DOCUMENTS

| 5,371,852 | A | 12/1994 | Attanasio et al. |
| 5,590,056 | A | 12/1996 | Barritz |
| 5,734,838 | A | 3/1998 | Robinson et al. |
| 5,737,526 | A | 4/1998 | Periasamy et al. |
| 5,774,870 | A | 6/1998 | Storey |
| 5,781,736 | A | 7/1998 | Schmidt |
| 5,819,047 | A | 10/1998 | Bauer et al. |
| 5,845,091 | A | 12/1998 | Dunne et al. |
| 5,903,874 | A * | 5/1999 | Leonard et al. .......... 705/14.26 |

(Continued)

FOREIGN PATENT DOCUMENTS

WO    WO 2004088947    10/2004

OTHER PUBLICATIONS

Wang et al., "Ticket-based service access scheme for mobile users," Australian Computer Science Communications archive, vol. 24, Issue 1 (Jan.-Feb. 2002) pp. 285-292.

*Primary Examiner*—Andrew J. Fischer
*Assistant Examiner*—Mamon Obeid
(74) *Attorney, Agent, or Firm*—Davidson Berquist Jackson & Gowdey, LLP; Brian Siritzky

(57) ABSTRACT

A system rewards users who offer to share the memory, storage, or bandwidth of their computing resource to third parties within a distributed network. Users share processing, storage, bandwidth or memory resources with third parties by permitting such third parties to access files stored in the memory of the users' computing devices. Users that offer files for upload are encouraged to register with a central authority, and receive value each time a third party accesses a resource from their computing devices. The value awarded to each such user is tracked by the central authority and is weighted.

23 Claims, 13 Drawing Sheets

U.S. PATENT DOCUMENTS

| | | | |
|---|---|---|---|
| 5,926,808 A | 7/1999 | Evans et al. | |
| 5,937,391 A | 8/1999 | Ikeda et al. | |
| 5,943,480 A | 8/1999 | Neidhardt | |
| 5,963,916 A | 10/1999 | Kaplan | |
| 5,978,791 A | 11/1999 | Farber et al. | |
| 6,009,411 A | 12/1999 | Kepecs | |
| 6,009,412 A | 12/1999 | Storey | |
| 6,041,343 A | 3/2000 | Nguyen et al. | |
| 6,061,660 A | 5/2000 | Eggleston et al. | |
| 6,076,069 A | 6/2000 | Laor | |
| 6,076,101 A | 6/2000 | Kamakura et al. | |
| 6,085,253 A | 7/2000 | Blackwell et al. | |
| 6,138,911 A | 10/2000 | Fredergill et al. | |
| 6,178,408 B1 | 1/2001 | Copple et al. | |
| 6,212,545 B1 | 4/2001 | Ohtani et al. | |
| 6,222,841 B1 | 4/2001 | Taniguchi et al. | |
| 6,230,204 B1 * | 5/2001 | Fleming, III | 709/229 |
| 6,275,820 B1 | 8/2001 | Navin-Chandra et al. | |
| 6,282,522 B1 * | 8/2001 | Davis et al. | 705/41 |
| 6,308,208 B1 | 10/2001 | Jung et al. | |
| 6,330,543 B1 | 12/2001 | Kepecs | |
| 6,339,765 B1 | 1/2002 | Maher | |
| 6,343,990 B1 | 2/2002 | Rasmussen et al. | |
| 6,370,527 B1 | 4/2002 | Singhal | |
| 6,378,075 B1 * | 4/2002 | Goldstein et al. | 726/5 |
| 6,415,280 B1 | 7/2002 | Farber et al. | |
| 6,434,548 B1 | 8/2002 | Emens et al. | |
| 6,460,086 B1 | 10/2002 | Swaminathan et al. | |
| 6,467,685 B1 | 10/2002 | Teicher | |
| 6,490,575 B1 | 12/2002 | Berstis | |
| 6,490,579 B1 | 12/2002 | Gao et al. | |
| 6,493,341 B1 | 12/2002 | Datta et al. | |
| 6,501,760 B1 | 12/2002 | Ohba et al. | |
| 6,505,237 B2 | 1/2003 | Beyda et al. | |
| 6,516,350 B1 | 2/2003 | Lumelsky et al. | |
| 6,523,023 B1 | 2/2003 | Sonnenberg | |
| 6,571,216 B1 | 5/2003 | Garg et al. | |
| 6,578,012 B1 | 6/2003 | Storey | |
| 6,636,854 B2 | 10/2003 | Dutta et al. | |
| 6,816,850 B2 | 11/2004 | Culiss | |
| 6,871,232 B2 | 3/2005 | Curie et al. | |
| 6,915,333 B2 | 7/2005 | Delia et al. | |
| 6,928,442 B2 | 8/2005 | Farber et al. | |
| 6,970,908 B1 | 11/2005 | Larky et al. | |
| 7,124,101 B1 * | 10/2006 | Mikurak | 705/35 |
| 7,263,528 B2 | 8/2007 | Haff et al. | |
| 7,266,684 B2 | 9/2007 | Jancula | |
| 7,269,577 B2 * | 9/2007 | Stefik et al. | 705/59 |
| 2001/0047275 A1 | 11/2001 | Terretta | |
| 2002/0007350 A1 | 1/2002 | Yen | |
| 2002/0023220 A1 * | 2/2002 | Kaplan | 713/176 |
| 2002/0026423 A1 | 2/2002 | Maritzen et al. | |
| 2002/0052885 A1 | 5/2002 | Levy | |
| 2002/0169854 A1 | 11/2002 | Tarnoff | |
| 2003/0093695 A1 * | 5/2003 | Dutta | 713/201 |
| 2003/0105812 A1 | 6/2003 | Flowers et al. | |
| 2003/0120593 A1 | 6/2003 | Bansal et al. | |
| 2003/0208406 A1 * | 11/2003 | Okamoto et al. | 705/18 |
| 2004/0010543 A1 | 1/2004 | Grobman | |
| 2004/0024719 A1 | 2/2004 | Adar et al. | |
| 2004/0073908 A1 | 4/2004 | Benejam et al. | |
| 2004/0088576 A1 | 5/2004 | Foster et al. | |
| 2004/0133640 A1 | 7/2004 | Yeager et al. | |
| 2004/0148434 A1 | 7/2004 | Matsubara et al. | |
| 2004/0199667 A1 * | 10/2004 | Dobbins | 709/240 |
| 2004/0255140 A1 | 12/2004 | Margolus et al. | |
| 2005/0015466 A1 | 1/2005 | Tripp | |
| 2005/0076082 A1 | 4/2005 | Le Pennec et al. | |
| 2005/0076087 A1 | 4/2005 | Budd et al. | |
| 2005/0080846 A1 | 4/2005 | McCleskey et al. | |
| 2005/0080858 A1 | 4/2005 | Pessach | |
| 2006/0015366 A1 * | 1/2006 | Shuster | 705/1 |
| 2006/0031309 A1 | 2/2006 | Luoffo et al. | |
| 2007/0067836 A1 * | 3/2007 | Busboom et al. | 726/10 |
| 2007/0162300 A1 | 7/2007 | Roever et al. | |
| 2007/0283423 A1 * | 12/2007 | Bradley et al. | 726/4 |

\* cited by examiner

300a

MONITORING OF COMPUTER-RELATED RESOURCES AND ASSOCIATED METHODS AND SYSTEMS FOR ALLOCATING AND DISBURSING COMPENSATION

CROSS REFERENCE TO RELATED APPLICATIONS

This application is a continuation of U.S. patent application Ser. No. 10/720,835, filed Nov. 24, 2003, and titled "Monitoring Of Computer-Related Resources And Associated Methods And Systems For Disbursing Compensation," the entire contents of which are fully incorporated herein for all purposes. Application Ser. No. 10/720,835 claims priority to U.S. Provisional Application No. 60/478,523, titled "Monitoring Of Computer-Related Resources And Associated Methods And Systems For Disbursing Compensation," filed Jun. 13, 2003, the entire contents of which are fully incorporated herein for all purposes.

FIELD OF THE INVENTION

The present invention is related generally to the field of computer applications and, more specifically, to measuring resource usage in distributed computing networks and subsequently compensating users based upon the extent and nature of resources utilized and/or shared.

BACKGROUND

A distributed computing network is comprised of multiple computing devices, such as personal computers, laptops, media players, personal data assistants, mobile phones, or any other type of network access device, capable of initiating and conducting direct data communication with each other through a network infrastructure, which can be wired or wireless. Each network access device operates as both a client computer, controlled by a first user, and a server capable of addressing requests generated from a second network access device, controlled by a second user.

Resource utilization and control of the network is therefore distributed among a plurality of client/server machines and is not centralized within a defined set of servers under the control of a single network operator. Consequently, determining the nature and extent of resource utilization, such as how much bandwidth, storage, or processing power is used, is difficult because the participants in the distributed computing network, namely each client/server computer, cannot be trusted to accurately or honestly report the correct nature and extent of their resource utilization.

While various techniques for measuring the usage of distributed resources are known, there are no known techniques for accurately and securely monitoring individual user resource usage in distributed networks, such as peer to peer networks. Conventional monitoring techniques assume centralized resource control, accurate resource usage reporting from users, or global resource usage estimations based upon extrapolated or interpreted data. Alternatively, conventional systems erect significant transaction barriers, such as requiring the issuance of security certificates or the registration of each transaction, which create substantial obstacles to conducting efficient transactions.

For example, U.S. Pat. No. 6,516,350 discloses a system for the management of distributed resources interconnected by a computer network and comprised of a plurality of limited supply resources (such as those associated with multimedia content servers). The patent, however, is directed toward systems where the resources, provided primarily by centralized servers, are under the control of a trusted party and, therefore, can be readily managed using known computing techniques.

U.S. Pat. No. 6,230,204 discloses a system for estimating the total usage of computer system resources by all users with access to those resources, performed in such a way that desired demographic information is available and computer users are not deterred from using the resource by the usage estimation techniques. This system selects a computer system resource of interest and receives demographic information on various computer users with access to the resource. It then uses the demographic information to select a representative sample of all computer users with access to the resource. A copy of the monitoring program is loaded onto each of the computer systems used by the representative sample. The system then executes the loaded copies of the monitoring program thus recording the usage of various computer system resources by the representative sample. The recorded information is then transferred to a central analyzing facility, where the total usage of the computer system resource of interest is estimated based on the usage of the representative sample users. The resource is then rated relative to other resources based on a resource characteristic that depends on the amount of usage. This patent does not disclose systems or methods for the actual measurement of resources being used or shared by a single user or set of users, but rather, estimates global resource usage of the entire system. Further, this patent does not address situations where users have an incentive to misrepresent the degree of resource utilization and/or sharing being conducted.

U.S. Pat. No. 5,819,047 discloses a method for authorizing the allocation of a resource of a computing system to a user on a network-wide basis using network-wide quotas. When a resource consumption request is received by an authority, a network-wide maximum-use quota amount of the resource that is associated with the user is compared to a network-wide resource amount that is in-use by the user. The requested amount of the resource is allocated on a network-wide basis based on whether the requested amount of the resource and the network-wide resource amount in-use by the user together do not exceed the network-wide maximum-use quota amount of the resource associated with the user. This patent simply addresses resource allocation in a controlled, centrally managed network. It does not address the monitoring of resource usage by individuals in a distributed network or without the benefit of central, trusted managing entity.

Consequently, current approaches are incapable of addressing situations where users artificially inflate the degree and extent of their resource utilization and/or sharing by various means. For example, users may exchange the same file repeatedly between each other to appear to be distributing large numbers of files and therefore sharing extensive amounts of memory or bandwidth. Users may also attempt to erroneously communicate or record incidents of resource usage or sharing that may not have occurred. Users may also share identities to aggregate resource utilization or sharing.

What is needed, therefore, is an effective resource utilization measurement system for a distributed computing network that is able to reliably and accurately operate where the client/server computing nodes being monitored cannot be trusted to accurately report, record, or represent resource utilization or usage. Preferably, such a system would be able to detect and prevent collusion between users who act fraudulently.

Further, a system is needed that is able to uniquely identify a user attempting to defraud the system by manufacturing a degree of resource utilization, to discriminate between legitimate resource usage and fraudulent resource usage, and to subsequently void illegitimate resource usage records without affecting legitimate records. Such a system should be optimal in that it is able to detect frauds and attacks on the system early and accordingly make software updates such that the new version is not subject to the same breach.

Additionally, the resource monitoring system should be designed such that the resource monitoring unit, such as a server in data communication with the plurality of network access devices, receives a minimum number of hits, does not interfere with the direct transactions occurring between multiple client/server nodes, and will only incur a reasonable amount of processing and data storage. The system can preferably cope with millions of transactions and does not have a single point of failure that prevents transactions from occurring and should be able to monitor transactions occurring over multiple sessions.

Given that distributed networks are defined by direct communications between client/server nodes and that users will abandon distributed networks having high barriers to completing transactions, it would be preferable for the system to not require individual client/server nodes to download large applications to operate, require all individual client/server nodes to register, or require or maintain large amounts of data on the identities of these individual client/server nodes.

Additionally, compensating individuals for sharing computing resources in a distributed network is not readily achievable with conventional reward or compensation systems. Conventional reward systems are based on electronic commerce systems that offer users, in exchange for their purchases of products or services, some form of currency, often referred to as loyalty points, that the users can later use to obtain discounts on, or free, products or services. An exemplary conventional reward system is the "miles" program, operated by most airlines, that allocates miles based upon the type of travel purchased and used by the user. Users can later use the allocated miles to obtain discounted, upgraded, or free travel.

For example, U.S. Pat. Nos. 6,578,012, 6,009,412, and 5,774,870 disclose an on-line frequency award program in which a user accesses the program on-line and browses a product catalog for shopping. The user may then electronically place an order, upon which the program automatically checks the user's credit and electronically issues a purchase order to the supplying company. The program also calculates award points, updates the award account of enrolled users, and communicates that number of awarded points to the user. Enrolled users may browse through an award catalog and electronically redeem an amount of awarded points towards an award. The program then electronically places an award redeeming order with the fulfillment house and updates the user's award account.

Conventional systems, and the disclosed patents, have limited applicability, however, in systems that compensate, reward, or deliver benefits to users for sharing or utilizing computing resources. The disclosed systems issue points based upon easily monitored and verified purchase transactions and are incapable of addressing situations where a trusted party is not conducting the transaction that forms the basis for the reward.

Therefore, what is also needed is a system for issuing or assigning compensation, rewards, or some other benefit based upon the results of the resource utilization measurement. Given the risk of collusion between various users, the system preferably only issues rewards, benefits or compensation based upon legitimate incidents of resource sharing, is capable of differentiating between fraudulent attempts to manufacture resource sharing, and is capable of modifying granted benefits based upon evidence or a determination of fraud or collusion. It is also preferred for the system to not issue the benefit or reward until a trusted entity has received all the necessary data to verify that resources were actually utilized.

SUMMARY OF THE INVENTION

The present invention provides methods and systems for measuring resource usage in a distributed information network, where parties engaging in resource sharing transactions cannot be trusted, and for rewarding users who share resources. In one embodiment, the present invention is directed toward a method of measuring the extent of resources provided by a second user to a first user in a distributed network. The method comprises the steps of associating a first trusted entity with the first user, associating a second trusted entity with the second user, receiving from the first trusted entity information about an intended resource use, providing a ticket from a server to the first trusted entity wherein the ticket includes at least portion of said information, transmitting the ticket from the first trusted entity to the second trusted entity, having the second trusted entity modify the ticket, transmitting the modified ticket to the first trusted entity, having the first trusted entity send the ticket back to the server, and having the server utilize the ticket and modified ticket to determine the extent of resources provided by the second user to the first user. The ticket can be transmitted from the first trusted entity to the server in an aggregated batch (with other tickets), individually, immediately upon receipt or after a predetermined delay.

Optionally, the resources provided by the second user include at least one of processing power or memory. The ticket issued by the server comprises at least one of a machine identification field, a field for a file name, a field for a hash of a file, a field for a randomly generated number, a weighting field, a time field, or a date field. The server stores a copy of said ticket. The second trusted entity validates the ticket by checking for a signature from the server.

Optionally, the method further comprises the step of having the first trusted entity validate the ticket. The method further comprises the step of having the server authenticate the identity of the first trusted entity prior to issuing said ticket. The first trusted entity is a signing module in data communication with a computing device. The first trusted entity comprises a receipt request generator, receipt generator module, receipt validation module, and a selection process module.

Optionally, the method further comprises the step of having the server conduct a redundancy check prior to issuing the ticket. In one embodiment, the step of conducting the redundancy check is achieved by determining whether a file being accessed by the first user has not already been downloaded. Optionally, the step of having the second trusted entity modify the ticket comprises providing a time stamp and signing the ticket.

In another embodiment, the present invention is directed toward a resource usage module capable of operating as a trusted entity in data communication with a computing device comprising a receipt request generator, receipt generator module, receipt validation module, and a selection process module.

In another embodiment, the present invention is directed toward an event record for monitoring an extent of resources provided by a second user to a first user in a distributed network comprising a plurality of tickets wherein each of said tickets comprises at least one of a randomly generated number field, a computing device identifier field, a date field and a time field, and a signature field and wherein each of said tickets contains information about the extent of resources or benefit provided by the second user to the first user.

In another embodiment, the present invention is directed toward a system for measuring the extent of resources provided by a second user to a first user in a distributed network, comprising a first trusted entity in data communication with a computing device used by a first user, a second trusted entity in data communication with a computing device used by a second user, a server in data communication with each of the first and second trusted entities wherein the server is capable of generating a ticket comprising at least one of a randomly generated number field, a computing device identifier field, a date field and a time field, and a signature field.

In another embodiment, the present invention is directed toward a method of awarding compensation to a second user based upon the extent of resources provided by the second user, operating a second computing device in data communication with a second trusted entity, to a first user, operating a first computing device in data communication with a first trusted entity, in a distributed network. The method comprises receiving from the first trusted entity information about an intended resource use, providing a ticket from a server to the first trusted entity wherein said ticket includes at least portion of said information, transmitting the ticket from the first trusted entity to the second trusted entity, having the second trusted entity modify the ticket, transmitting the modified ticket to the first trusted entity, utilizing the modified ticket to determine the extent of resources provided by the second user to the first user, and allocating value to the second user based upon said determination of the extent of resources provided by the second user. Optionally, the method further comprises providing the second user an interface to purchase a plurality of products using the allocated value. Optionally, the method further comprises providing a website an interface that is capable of receiving a request by the website to validate a purchase from a user wherein said purchase uses said allocated value.

The aforementioned and other embodiments of the present shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings.

DETAILED DESCRIPTION

The present invention is directed toward methods and systems for monitoring resource usage in an architecture where neither the resource buyer nor the resource seller can be trusted and for rewarding benefits, compensation, or rewards (hereinafter referred to as value) based upon such monitored resource usage data. More specifically, the system rewards users who offer to share the memory, storage, or bandwidth of their computing resource to third parties within a distributed network. In an exemplary embodiment, users share memory resources with third parties by permitting such third parties to access files stored in the memory of the users' computing devices. Users that offer files for upload are encouraged to register with a central authority, and receive value each time a third party accesses a file from their computing device. The value awarded to each such user is tracked by the central authority. They can, at a later date, use the value in exchange for products or services. The present invention will be described in further detail with reference to the accompanying drawings. As used herein, the term computing devices broadly encompasses any type of computing device that could be placed in data communication with a network. For example, the computing device could be any one of a personal computer, laptop, personal data assistant, mobile phone, wireless email manager, media player, computing tablet, set-top box, networked DVD player, or other type of network access device. Each of said devices has a processor, memory, and a communication interface, such as a modem or Ethernet port. Similarly, the term network broadly encompasses any type of network, including local area networks, wide area networks, metropolitan area networks, and wireless networks based on infrared, Bluetooth, wide area data, cellular telephony, WLAN, paging, or satellite technology.

Figure 1A:
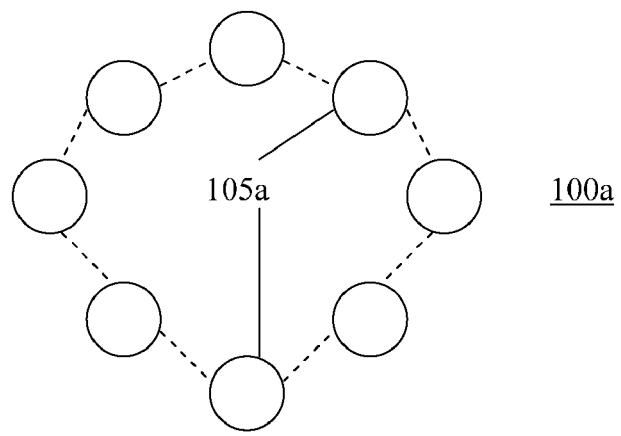
FIGS. 1a to 1c are schematic diagrams of embodiments of network configurations used by the present invention.

In one embodiment, the network topology is a ring network. Referring to FIG. 1a, a network 100a comprises a plurality of computing devices 105a operating as individual client and server nodes and providing load-sharing and failover capabilities. The network 100a is structured as a ring.

Figure 1B:
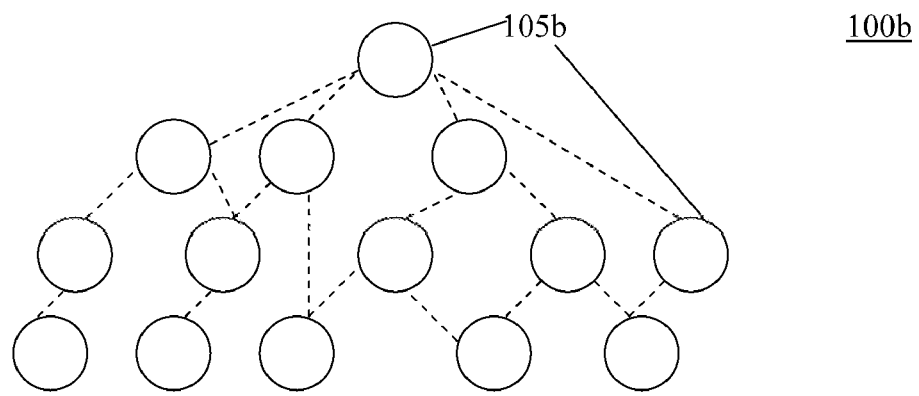

In another embodiment, the network topology is hierarchical. Referring to FIG. 1b, a network 100b comprises a plurality of computing devices 105b, operating as individual client and server nodes and providing load-sharing and failover capabilities. The network 100b is structured such that each computing device 105b keeps connecting to a parent node until a root server is accessed.

Figure 1C:
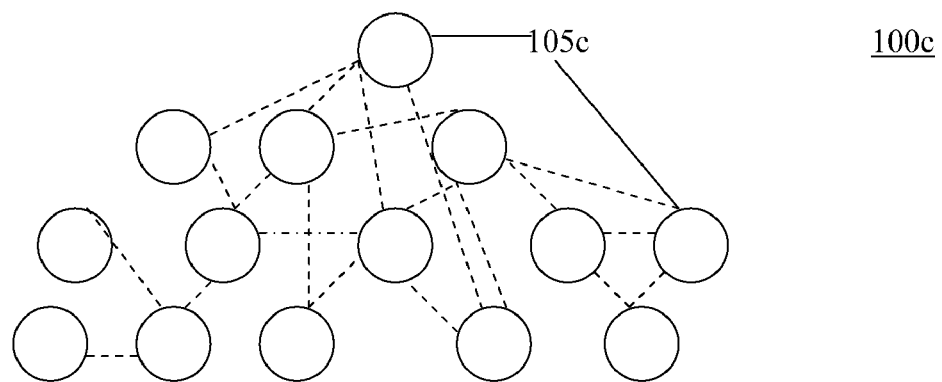

In another embodiment, the network topology is scattered, as shown in FIG. 1c. A network 100c comprises a plurality of computing devices 105c operating as individual client and server nodes and providing load-sharing and failover capabilities. The network 105c is structured such that each computing device 105c is randomly interconnected with a plurality of other computing devices 105c. One of ordinary skill in the art would appreciate that, within such a topology, certain computing devices 105c may operate as supernodes that are responsible for maintaining indexes of available files and communicating with a greater percentage of computing devices 105c. One of ordinary skill in the art would further appreciate that other topologies are within the scope of this invention, including hybrid topologies that combine various aspects of ring, hierarchical and scattered topologies.

The networks shown in FIGS. 1a through 1c represent the physical transport layer that is used to enable the transmission of content from a source node to a destination or requesting node. Each node comprises a computing device operating an application, such as a peer to peer application, that serves to manage the requesting, storage, display, and transmission of content.

In a preferred embodiment, a peer to peer application operates as an interface to a user for the receipt of content requests, issuance of requests, transmission and reception of content, and management of content data. The peer to peer application preferably communicates with the transport layer through a data interface and kernel layer that provide the application access to key support services, such as b-trees, address manipulation, hashing, queue management, buffer management, logging, timers, and task scheduling.

Although the present invention will be described with particular focus on monitoring the sharing of memory resources, the system is also preferably designed to award points to people who make their processors available for distributed processing tasks and their bandwidth available for communication tasks. The present invention is intended to apply to all types of peer to peer based networks and applications, including collaborative or distributed computing, such as the Seti@Home project, instant messaging, such as MSN, AOL, and Yahoo instant messaging, specialized networks, such as corporate networks or other closed networks, and general networks designed to enable the transfer or sharing of any type of file.

The present invention is designed to enable the monitoring of resource usage in networks where neither the resource provider or resource user can be trusted to accurately represent the nature and extent of resources being used, shared, or provided. The present invention is also designed to provide a consequence to such resource monitoring, including the provision of rewards, points, compensation, awards, consideration or other forms of value that is related to, or dependent upon, the results of the resource monitoring.

Figure 2:
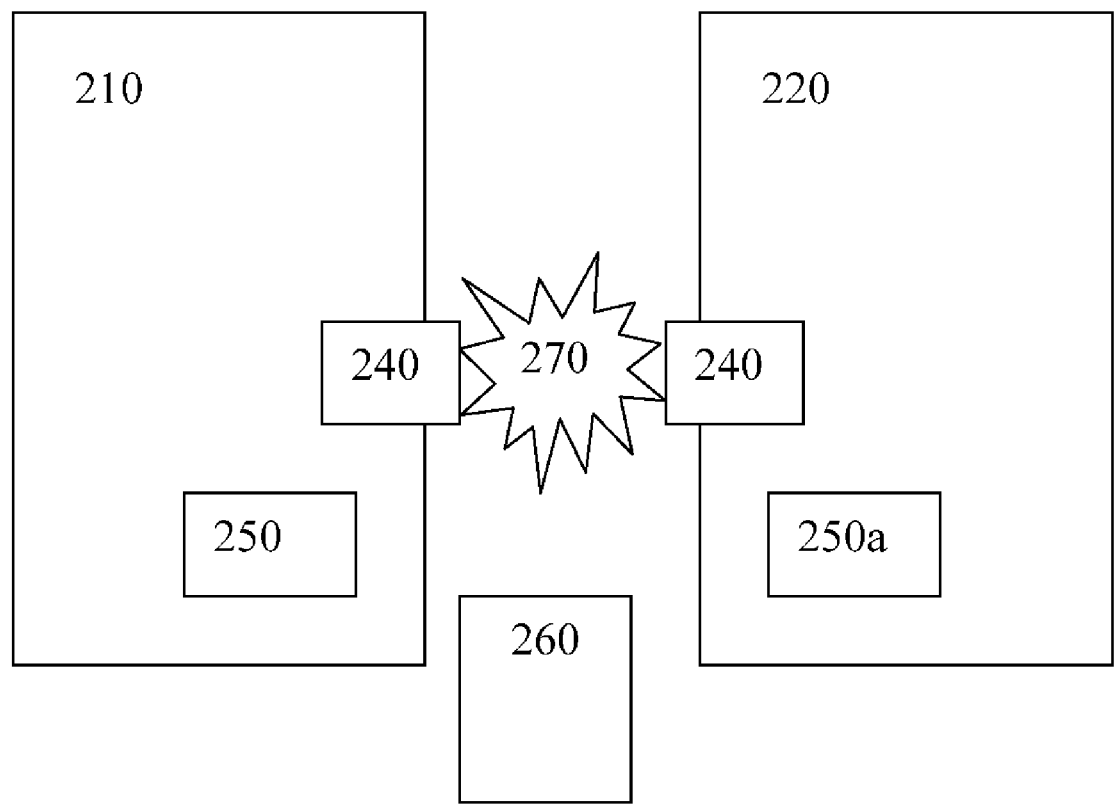
FIG. 2 is a diagram depicting a plurality of components used in one embodiment of the present invention.
Figure 3A:
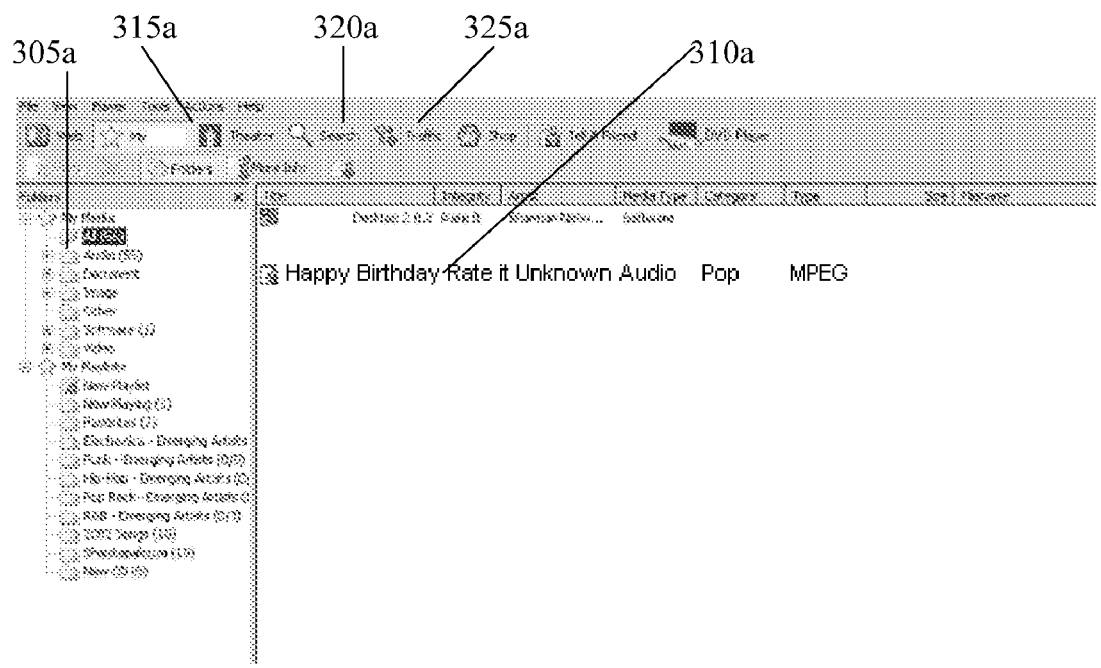
FIGS. 3a and 3b are exemplary interfaces for applications used in the present invention.
Figure 3B:
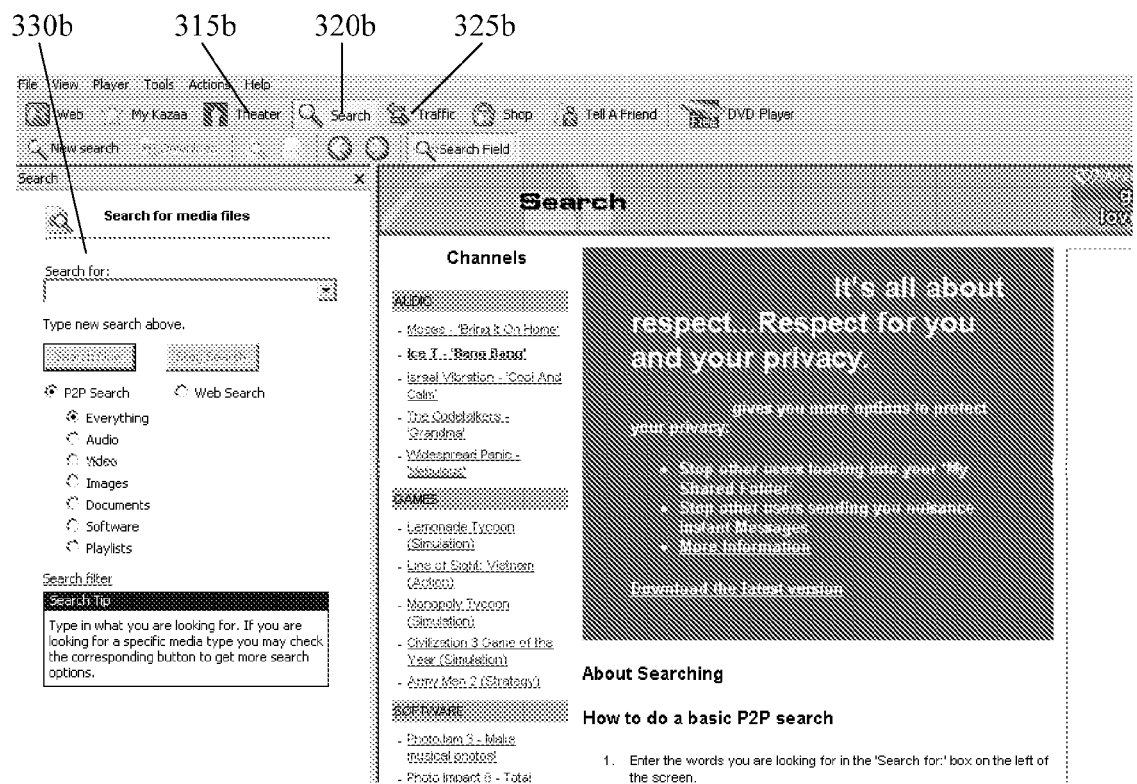

Referring to FIG. 2, an exemplary embodiment of the system of the present invention is shown. A first computing device 210 and a second computing device 220 are capable of accessing a common network 270. Network 270 can be any type of network, as previously discussed. The first and second computing devices 210, 220 both comprise a peer to peer application 240 and a Resource Usage Verification Module ("RUVM", also referred to as "trusted entity") 250 and 250a, which are stored in a computer medium and executable by a plurality of processors. In one embodiment, the peer to peer client application 240 provides an interface to permit users to identify content, obtain it from the peer to peer network, and manage the obtained content. Referring to FIG. 3a, the application 300a comprises a plurality of windows and interfaces, including a file management interface 305a to access obtained content 310a, a theater 315a to play the content, a searching function 320a to enable users to search for specific content, and a traffic progress screen 325a to permit users to identify where the content is being accessed and the progress of the content download. In a second view, shown in FIG. 3b, the searching interface 330b is provided. The menu comprising the theater 315b, search functionality 320b, and traffic 325b remains substantially similar. One of ordinary skill in the art would appreciate that many others types of applications, interfaces, screens, windows, and user functionality can be provided. One of ordinary skill in the art would also appreciate that the application communicates with the transport layer through a data interface and kernel layer that provide the application access to key support services, such as b-trees, address manipulation, hashing, queue management, buffer management, logging, timers, and task scheduling.

The Resource Usage Verification Module 250, 250a (RUVM) are trusted applications that may be relied on to accurately and honestly report resource usage to the Resource Usage Verification Authority 260 in accordance with the methods of the present invention. The RUVM 250 may be a separate application that communicates with the peer to peer client application through a pre-designated interface, a module that is integrated into the peer to peer application itself, a module that is integrated into the operating system of the computing device, or a remotely located module that is accessed by the peer to peer application through a data network.

Referring back to FIG. 2, after the first computing device 210 receives a request by a user or program or service to access a third party resource, such as bandwidth, memory, or processing power, the peer to peer application 240 transmits such a request to the RUVM 250 which packages the request and communicates it to the Resource Usage Verification Authority (RUVA) 260. The RUVA 260 generates a resource usage ticket (not shown), in accordance with the resource usage request, and transmits that ticket back to the RUVM 250 of the first computing device 210. The RUVM 250, operating on the first computing device 210, communicates the resource usage ticket to the RUVM 250a of the second computing device 220. The RUVM 250a of the second computing device 220 confirms the use of a certain resource by modifying the resource usage ticket, in a pre-defined and secure manner. The modified ticket is communicated back to the RUVM 250 of the first computing device 210 and, accordingly, back to the Resource Usage Verification Authority 260. The RUVA 260 is able to accurately track the resources being used by various parties. A Value Issuer (not shown) is then able to issue value based upon the resource monitoring results.

Using the present invention, the resource usage of non-trusted entities, namely the first and second computing devices, can be monitored. The present invention will be described in greater detail with particular focus on the authorization of a user to participate in the resource monitoring system, the RUVM, the resource monitoring system in operation, the nature of the resource usage ticket and event record, the prevention of fraud, the allocation of value based upon the operation of the resource monitoring system, and the use of that value by users to obtain products and/or services.

Authorization to Participate in the Resource Monitoring System

In one embodiment, a certification process is implemented to prevent users of computing devices from sharing digital identities and improperly claiming and accruing value, and to provide a framework for detecting fraud and implementing various business rules. In a first step, the certification process preferably enables the trusted entity, e.g. the resource monitor, to uniquely identify a computing device. In a second step, the certification process preferably enables the trusted entity to uniquely identify both the user and the computing device.

In one preferred embodiment, the certification process enables the Resource Usage Verification Module, which operates on or in conjunction with each computing device, to uniquely identify the computing device with which it is associated. The certification process is initiated by a Certificate Request Module, which initiates a request, from a user's computing device, when a new certificate is required on the user's PC. A new certificate may be required for new users, when a pre-determined amount of value has accrued, when a previous certificate has expired, or if a user damages or removes an existing certificate. The Certificate Request Module takes, as input, a request for a certificate and returns a certificate request packet to be transmitted to a Certificate Authority Module.

The Certificate Authority Module is executed by a trusted server and generates certificates that are installed on user's machines The certificate can be defined as a container for any information preferably stored on the user's machine and digitally signed to ensure that the user has not altered its contents. A certificate will preferably contain information such as a username; machine identifier information (CPU, hard drive serial number, MAC address); a unique ID (ID) which is assigned to this user's PC; business rules, such as the maximum points earnable in a day; a predetermined time period stating the frequency at which the signing module should report statistics; and a percentage of receipts the signing module should send to the server. An XML string containing any information that is to be stored into the certificate may be input into the module, which then returns a certificate in the form of an XML string. One of ordinary skill in the art would appreciate how a trusted server can issue a certificate to authenticate an application on a remote computing device and ensure that the application is associated with a unique computing device ID.

Preferably, a user can obtain a certificate by simply having one associated with his or her computing device. Such a certificate should permit the user to access third party resources and have the resources utilized properly monitored and measured. However, where the user begins to provide resources to the network and, consequently, begins to accumulate, earn, or obtain value for doing so, it becomes desirable to ensure that the individual user is personally associated with a certificate, not just the user's computing device. Therefore, a second certification step is preferably employed.

In one embodiment, a secret key, issued to the RUVM in the course of the first certification process, is used to facilitate the certificate request. A user is requested to provide personal identifying information, such as his or her name, address, phone number, and/or email address, to associate the user's identity with the already issued certificate. The user is also preferably asked to agree to a set of terms and conditions governing any potential allocation of value or use of such value based upon the extent of resources shared. It should be appreciated that the RUVM adds machine ID information and its private key to the personal information prior to encryption and transmission to the RUVA. After decrypting the data and verifying the information, the RUVA responds with a return code indicating a successful receipt of the registration information.

The certificate request is preferably initiated after the RUVM or RUVA determines that the user has engaged in a sufficient amount of sharing of computing resources and, therefore, accumulated a pre-designated amount of value. In one embodiment, the RUVA initiates a reminder to the user to provide personal information after a pre-designated amount of time. In another embodiment, the user is periodically reminded to provide personal information after a pre-designated amount of value has accrued. In another embodiment, the RUVA initiates a reminder to the user to provide personal information before the RUVM is issued new key and certificates.

One of ordinary skill in the art should appreciate that the disclosed approach to issuing certificates is a preferred approach and that other approaches are also within the scope of the present invention. For example, each user could be required to go through a complete certification process at the outset of usage, as opposed to permitting a machine-based certification process to occur as an initial step. Other triggers, besides value accumulation, could be used to force the registration of a user, including elapsed time or extent of usage.

The Resource Usage Verification Module

Figure 4:
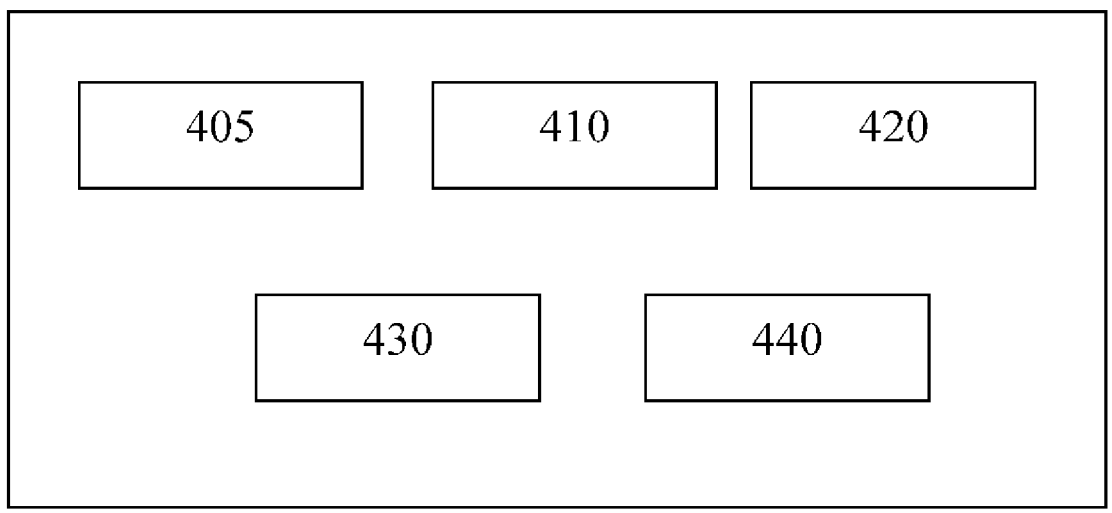
FIG. 4 is a diagram of a plurality of components comprising one embodiment of a resource usage verification module.

Referring to FIG. 4, the RUVM 400 is a software module that monitors which resources are obtained by the peer to peer application and from where they are obtained. Preferably, cryptographic modules, such as public-key cryptographic modules or other cryptographic systems that are described in prior art, are used to provide the requisite level of security. In one embodiment, these cryptographic modules are embedded in the RUVM.

Receipt request generator 405 is a component that is initiated by the resource providing computing device at the end of a successful instance of resource sharing, such as the uploading of a file. The receipt request generator 405 accepts as inputs a file name or ID, the number of kilobytes uploaded, the particular machine's ID, and/or any other information for encoding into a ticket. The receipt request generator 405 subsequently returns a digitally signed invoice.

Receipt generator module 410 is a component that is initiated by the client peer at the end of a successful instance of resource sharing, such as the downloading of a file, and operates in conjunction with receipt request generator module 405. Receipt generator module 410 receives as inputs a file name or ID, the number of kilobytes uploaded, the particular machine's ID, and any other information for encoding into a ticket. The receipt generator 410 returns a digitally signed receipt.

Receipt validation module 420 is a component that is established by the client peer after a receipt has been received from a server peer. Module 420 verifies that the received receipt is correct by comparing the information contained within the digitally signed receipt with corresponding information provided by the local peer to peer stack or other software component responsible for resource usage. Module 420 accepts input of a receipt plus corresponding crosscheck information obtained from the local peer to peer stack or other software component responsible for resource usage, and returns a flag indicating whether the receipt is valid or invalid.

Selection process module 430 is a component that is initiated when receipts are chosen to be sent back to the server.

The RUVM is a trusted entity but is expected to operate in a potentially hostile environment, specifically on the computing devices or in association with the computing devices of persons who are not trusted. To ensure that the RUVA is communicating with a trusted RUVM, the code and key material defining the RUVM may be obfuscated, thereby preventing the creation of illegitimate or fraudulent RUVMs and ensuring that its report of activities or files which have been conducted and/or received can be trusted.

Preferably, the RUVM code is also designed to stop operation if it detects that it is being run in a debug environment.

In one embodiment, the RUVM's authentication and confidentiality key pairs are held within the obfuscated RUVM software. They can optionally be further obfuscated using obfuscation functions available in some encryption toolkits well known to those of ordinary skill in the art. These keys are vulnerable to breach and should be regenerated each time the RUVM software is re-released, at minimum monthly and if possible, every few hours.

The RUVM's computing device ID specific authentication keys cannot easily be obfuscated within the software because the RUVM software creates them dynamically. A preferred approach to protecting these authentication keys is to enclose them in a wrapper, such as a PKCS#12 wrapper as is known in the art, and additionally password-protect them using a password known only to the RUVM. It is desirable that the password should not be the same for all RUVMs because this would be readily circumvented by the theft of PKCS#12 wrappers and thus create a relatively insecure environment. In one embodiment, a second layer of protection could be provided by conducting a function on the machine ID, other data, and a fixed symmetric key in the RUVM software. For example, one could perform a XOR hash of the machine Id and user name with a fixed symmetric key housed in the RUVM software, thereby preventing a stolen private key from being accessed by another copy of the RUVM running on a computing device.

Resource Monitoring System in Operation

Figure 5:
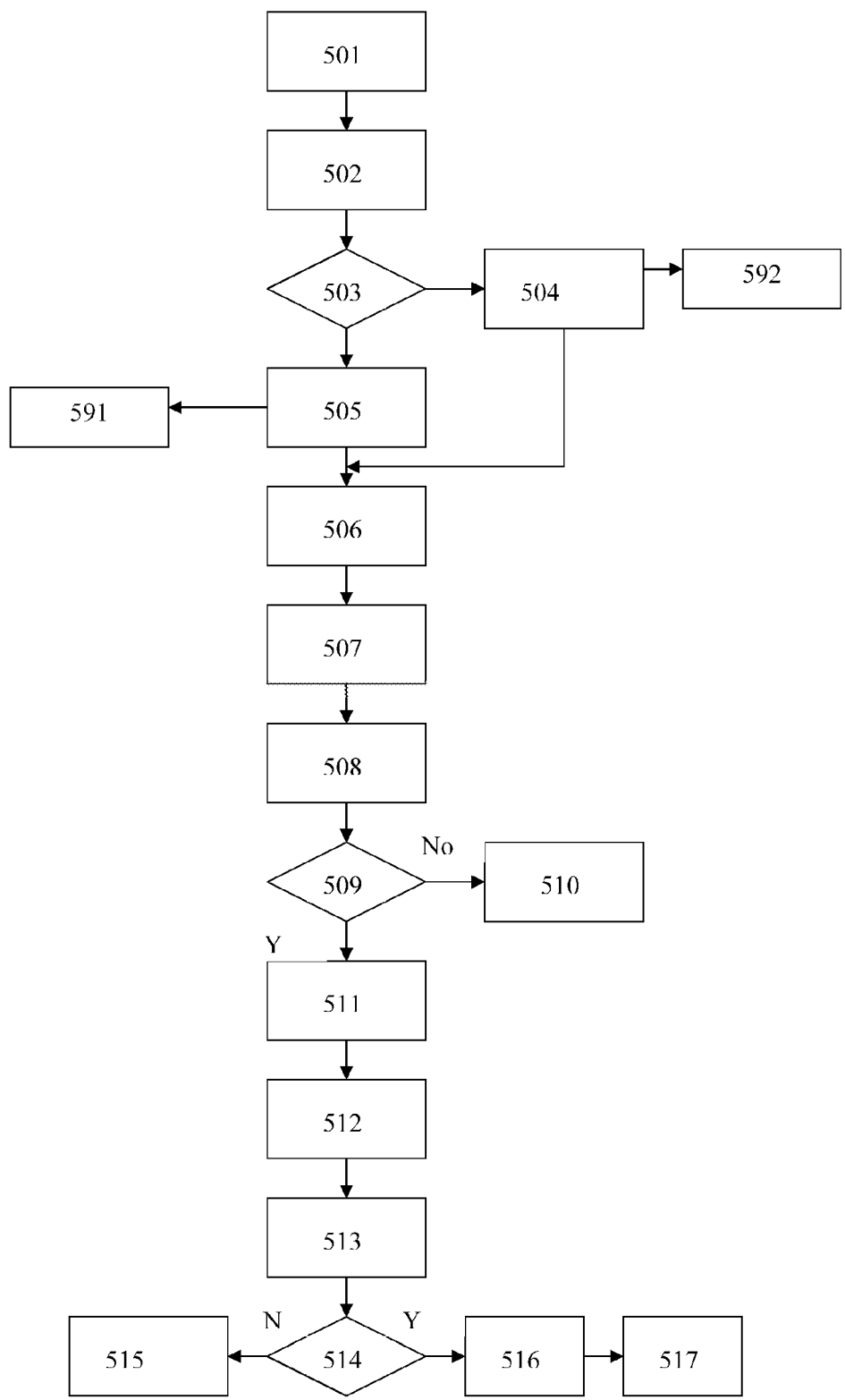
FIG. 5 is a flowchart depicting an exemplary embodiment of one process of the present invention.

Referring to FIG. 5, a flowchart depicting an exemplary embodiment of the entire process of the present invention is shown. In step 501, the user operating a first computing device selects a resource to access, such as file to download, using a peer to peer application. The application that is requesting the file or resource communicates details of the intended file to the first computing device's RUVM. The first computing device's RUVM transmits details of the identified file to the RUVA in step 502. By forcing the first computing device to establish communication with the RUVA, the system ensures that a trusted entity is always authenticating a transaction and ensures that the latest, valid version of the RUVM is being used.

Because of the importance of establishing a trust relationship with the first computing device's RUVM, the RUVA preferably determines and validates the identity of the RUVM each time the RUVM communicates with the RUVA. In one embodiment, this validation can occur by having the RUVA issue a random challenge to the RUVM and having the RUVM sign the response to the challenge using a private key.

Once a trust relationship has been established, the RUVA preferably conducts, in step 503, a redundancy check to ensure that the file being downloaded has not already been downloaded to that machine, that a resource usage ticket has not already been issued for the same download, or that the contemplated transaction has not, in effect, already been repeated. The purpose of this redundancy check is to ensure that the system does not allocate resource usage to entities that are, in fact, wasting resources by repeatedly downloading the same file or otherwise conducting the same transaction.

If the conditions stated in step 503 indicate that the transaction is not redundant, the RUVA responds in step 505 with a signed resource usage ticket containing a plurality of variables. In one embodiment, the resource usage ticket contains the first computing device's machine ID, the name and hash of the file which is being downloaded, a randomly generated number, a flag indicating whether weight should be given to the transaction and to what extent value should be awarded for that particular transaction, a communication flag which sends an instruction to the RUVM of the resource providing computing device, and a time and date stamp. The RUVA stores 591 the resource usage ticket for future verification. The terms "resource usage ticket" or "ticket" are intended to cover any type of data structure or file that communicates basic transactional and verification information and includes the terms invoice, tag, receipt, file, chit, and other transactional carriers.

It should be noted that a single resource request may be fulfilled by multiple resource providers that each provide a fraction of the total resource. For instance, in the case of a file download, parts of the file may be downloaded either in parallel or in serial sequence from a number of sources on the P2P network. The resource monitoring system is capable of, and has been expressly designed to allow, resource metering where multiple sources each provide a part of the total resource. Therefore, throughout this document, wherever a resource provider is mentioned (including use of the terms "second users", "uploader", "resource provider") the term should be taken to read "one or more resource providers", and the mechanisms described should be taken to apply to all users or devices that are supplying a requested resource, even partially.

If the conditions in step 503 are such that the file has already been downloaded to that computing device or that a ticket has already been issued to that computing device for that particular transaction, the RUVA still generates a resource usage ticket but sets a flag in the resource usage ticket to a pre-designated level to indicate that this transaction should not be given full weight, as provided in step 504. Specifically, the flag serves to inform the system that resources are not, in fact, being properly used and that any value associated with such resource usage should be minimized, if not negated altogether. The RUVA stores 592 the resource usage ticket for future verification.

The peer to peer application starts the download process 507 by first communicating 506 through the appropriate peer to peer stack and establishing a connection with the peer to peer application resident on the second computing device. In step 508, the first computing device's RUVM forwards the resource usage ticket, received from the RUVA, to the second computing device's RUVM via the established connection. The second computing device's RUVM verifies the signature 509 on the resource usage ticket and confirms that it was signed by the RUVA.

If the signature verification fails, the RUVM assumes that the resource usage ticket has been corrupted or that the user of the second computing device is attempting to defraud the system by introducing a fraudulent resource usage ticket into the system. The second computing device's RUVM silently logs 510 the details of the breach including the time and the IP addresses of the first computing device and second computing device.

If the resource usage ticket is valid, the second computing device's RUVM time stamps and countersigns the resource usage ticket and transmits the resource usage ticket back to the first computing device in step 511. After the authentication processes are completed, the file is uploaded from the second computing device and downloaded by the first computing device 512. On completion or abortion of the download, the second computing device's RUVM adds the details of the time taken by the file transfer and the number of bytes uploaded to its copy of the resource usage ticket. In step 513, the second computing device's RUVM signs the resource usage ticket with its own key and the user's individual key (if one is available) and writes it to a storage medium for future reconciliation.

The first computing device's RUVM checks the machine ID provided in each resource usage ticket that it receives back from the second computing device to authenticate a match in step 514. If the first computing device's RUVM detects that the machine ID is not its own, or that the resource usage ticket does not match the ticket originally transmitted to the RUVM by the RUVA, the RUVM assumes the resource usage ticket is invalid and that it may be indicative of an attempt to defraud the system. In step 515, the first computing device's RUVM logs the details of the attempted fraud, including the time of occurrence and the IP addresses of both the first computing device and second computing device.

Where the resource usage ticket is validated, the first computing device's RUVM creates an event record for the download in step 516. The event record comprises signed copies of the resource usage ticket obtained in the course of each transaction conducted with third party computing devices, along with details of the volume of data downloaded from each third party. In step 517, the first computing device's RUVM signs the event record and writes it to a storage medium for future reconciliation. As described below, the event record and tickets are designed to be manageable, secure receipts indicating the flow of a transaction and/or a plurality of transactions.

Figure 6:
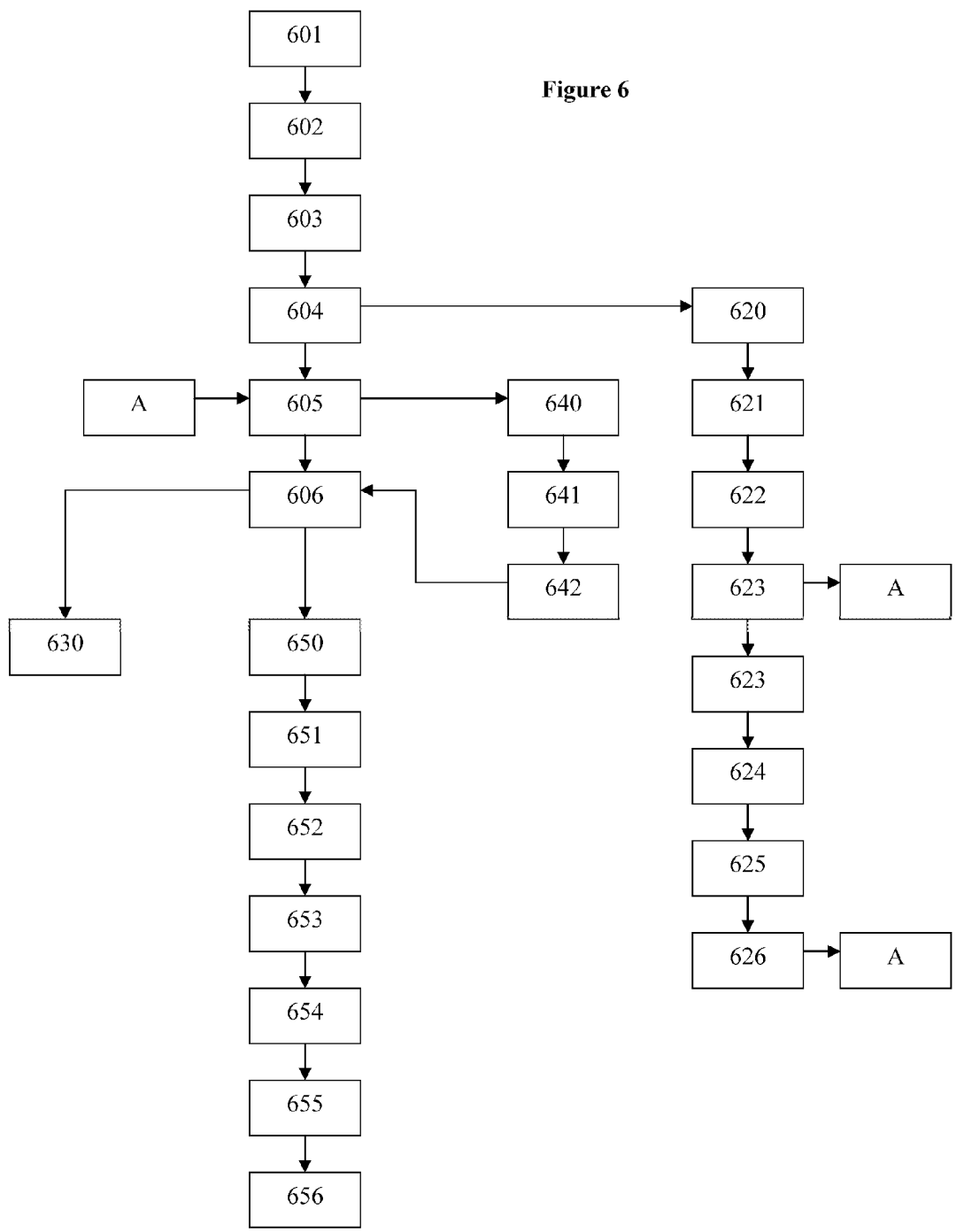
FIG. 6 is a flowchart depicting an exemplary embodiment of a process for collecting and collating resource usage tickets.

To effectuate an objective of the present invention, it is important for historical resource usage transactions, captured in the form of tickets and event records, to be accumulated, calculated, and stored. In one embodiment, each RUVM communicates the receipts to the RUVA for validation and for collation to determine the extent of resource usage. Referring to FIG. 6, one exemplary process for transmitting the receipts from the RUVM to the RUVA is described. As previously discussed, periodically a session is established 601 between the RUVA and RUVM associated with a computing device. Preferably, the RUVA conducts a transaction to ensure the identity of the RUVM. In one embodiment, the RUVA issues a challenge to the RUVM, such as requesting the RUVM to read a plurality of random bytes from one or more downloaded files. After the RUVM responds with details of the bytes, the RUVA checks the bytes against its record of the file. After the establishment of such a session 601, the RUVM preferably checks 602 a plurality of sources, including memory and storage facilities associated with the computing device, to determine if there is at least one event record that indicates an unreconciled download has been successfully completed. If such a record exists, the RUVM communicates 603 the record to the RUVA.

The RUVA verifies 604 the RUVM's signature embodied in the event record. The RUVA then verifies 605, for each ticket within the record, the signatures of the RUVM of the computing device that provided the resource being monitored. The RUVA then validates 606 that it issued the tickets within the event record by checking the contents of the ticket against a database of ticket contents stored on a memory or storage device associated with the RUVA.

Each RUVM provides an event record detailing the nature of the resources used or shared in conjunction with a third party user. The RUVA can limit its operation to the monitoring of resource usage and determination of which computing devices and users are responsible for the greatest use, to the calculation of average resource use, or to the specialized calculation of resource use as categorized by geographic region, machine ID, or other variables. However, in a preferred embodiment, the RUVA uses the event record to assign and allocate value. In one embodiment, the RUVA modifies 630 a plurality of database records based upon the event record. One database record comprises a plurality of machine IDs listed in row format and value listed in column format. When the RUVA reads an event record, it determines both the extent of resource use, such as the number of bytes, and the source of the resource, as indicated by the machine ID. The RUVA modifies the database record by associating the determined extent of resource use (i.e. the number of bytes) with the resource source, i.e. the machine ID. Preferably, associated value is flagged, escrowed, or otherwise marked as "to be validated" and only becomes recognized value when the value is, in fact, validated by a validating process, an example of which is described below.

Preferably, the RUVA conducts maintenance procedures designed to avoid the accumulation of redundant tickets and event records. In one embodiment, the RUVA deletes 650 copies of the event records and corresponding tickets, unless the event record is marked as a record that should be maintained. The RUVA sends 651 an acknowledgement to the RUVM, which, in turn, deletes 652 its own copies of event records and tickets. The RUVM collates 653 the details of any errors that have been detected in to a single error log data structure and transmits 654 it to the RUVA. The RUVA checks 655 the signatures on each error log entry to ensure none of the error log entries are missing from the sequence and stores 656 the details of the errors reported in its own error log, together with the details of the machine ID.

In certain cases, the initial verification, as described in steps 604-606, process fails. If the RUVA is unable to verify 620 the RUVM signature, the RUVA can determine that the event record has been corrupted and therefore cannot be used or that the owners of a plurality of computing devices, probably of computing devices associated with the signatures in the tickets of the various event records, are colluding to defraud the resource monitoring system.

In one embodiment, the RUVA requests 621 that the RUVM resend the record. The RUVM resends 622 the record and the RUVA attempts to verify 623 the RUVM's signature for a second time. If this second signature verification passes, the problem can be assumed to be data corruption in transit and the verification process resumes at step 605. If the second signature verification fails, the RUVA attempts to verify 624 the personal signature of the user associated with the computing device responsible for sharing the resource, if such a signature is present, on each ticket within the event record. The RUVA records 625 the details of the IP address associated with the RUVM and whether each of the personal signatures of the aforementioned users are validated successfully or fail the validation process. Recognizing the possibility that this event record may have been tampered with or be fraudulent, the RUVA activates 626 an alarm, which may be viewed by an administrator, and highlights a copy of the suspect event record. The validation process resumes at step 605 and continues through to completion. It is preferred, however, that the event record be flagged and that value not be issued based upon the event record.

Referring back to validation step 605, the RUVA may not successfully validate, on each ticket, the signature of the RUVM associated with the computing device sharing or providing the resource. If such a validation fails, the RUVA can conclude that the user providing the resource or the user accessing the resource has tampered with the ticket or the ticket has been corrupted in transit. Preferably, the RUVA attempts to verify 640 the personal signature of the user associated with the computing device responsible for sharing the resource, if such a signature is present, on each ticket within the event record. The RUVA records 641 the details of the IP address associated with the RUVM and whether each of the personal signatures of the aforementioned users are validated successfully or fail the validation process. Recognizing the possibility that this event record may have been tampered with or be fraudulent, the RUVA activates 642 an alarm, which may be viewed by an administrator, and highlights a copy of the suspect event record. The validation process resumes at step 606 and continues through to completion. It is preferred, however, that the event record be flagged and that value not be issued based upon the event record.

It should be appreciated by one of ordinary skill in the art that other instances of event record or ticket corruption may occur and that, in cases, no value should be associated with such records or tickets. For example, in another embodiment, the RUVA determines that one or more tickets do not match locally stored database records of tickets (not shown). The RUVA then attempts to verify its own signature on the tickets received but not matching local records. If the RUVA is able to verify its own signature, the RUVA assumes that the failure to identify a matching ticket record is indicative of an attempt by a user to submit multiple tickets for the same resource sharing or usage event. The RUVA preferably does not associate any value with the resource usage or sharing documented in the duplicate tickets. If the signature check fails, the RUVA can determine that the ticket has been tampered with or corrupted in transit. The RUVA preferably does not associate any value with the resource usage or sharing documented in the corrupted or fraudulent tickets. Similarly, if the RUVM cannot read local files or if resource usage values differ between the RUVM records and RUVA records, the RUVA can assume the tickets and/or event records have been corrupted, tampered with, or improperly modified.

In all such cases, it is preferred that the RUVA record instances of suspected tampering or fraud. In one embodiment, the RUVA records the computing device ID associated with the submission of the event record and corresponding tickets. In another embodiment, the RUVA records the computing device IDs of the machines that provided or shared the resource, as identified in the event record and corresponding tickets. In another embodiment, the RUVA records the users associated with the computing device ID of the machines that provided or shared the resource, as identified in the event record and corresponding tickets. The records are organized into a database format and are preferably accessible to an administrator. The administrator can then organize the database to identify whether any fraud pattern exists or determine whether any specific machine IDs or users are responsible for an inordinate number of fraudulent, tampered, or corrupted event records or tickets. The administrator can then choose to block the user or machine from the service, deny the user or machine access to value, or fine the user or machine.

It is also preferred to have a periodic trigger that would ensure that the validation and reconciliation process occurs on a regular basis. In one embodiment, each RUVM can simply be required, at a randomly selected or predetermined period of time, to seek and establish communication with the RUVA. In another embodiment, a RUVM is prompted to connect to the RUVA when a communication flag, embedded within a ticket, activates the RUVM and instructs the RUVM to connect. In another embodiment, the user of a machine may be prompted to seek and establish communication with the RUVA by advertisements, offers, or restrictions on the ability to access value associated with the resources shared by the user.

As discussed above, it is preferable to have a validating mechanism to ensure that issued value should, in fact, have been issued. Described in relation to step 630, the RUVA modifies a plurality of database records by associating value (derived as a function of the nature and extent of resources shared) with a machine ID and that such associated value is flagged, escrowed, or otherwise marked as "to be validated" and only becomes recognized value when the value is, in fact, validated by a validating process.

In one embodiment, a RUVM checks for the existence of stored tickets that indicate the computing device with which the RUVM is associated shared a resource, as denoted by a value, such as a number of bytes or extent of processing power. If such tickets exist, the RUVM sends them to the RUVA. Such a transmission can occur periodically, upon user prompting, randomly, or after a communication flag within one or more tickets activates the process.

On receipt of the signed tickets, the RUVA checks the signatures of each RUVM associated with the computing device sharing the resource, validates the signature, and, if successful, transmits an acknowledgement to the RUVM. The RUVM deletes copies of its own tickets, collates the details of any errors that have been detected into a single error log data structure and sends the error log to the RUVA. The RUVA then checks the signatures on each of the error log entries and ensures that none of the error log entries is missing from the sequence. The RUVA stores the details of the errors reported in its own error log.

One of ordinary skill in the art should appreciate that this process is also subject to errors and failures, which require alternative data flow processes to ensure the effective operation of the system. For example, if the RUVM signature on any of the tickets fails to verify, then this may be due to data corruption in transit, and the RUVA requests that the RUVM resends the offending ticket. The RUVA attempts to verify the RUVM's signature for a second time. If this second signature verification passes, the system can assume the initial failure was due to data corruption. If the second signature verification fails, then the system can assume the failure is due to tampering or fraud. In such cases, the administrator is alerted and the suspect ticket is sent to the administrator for analysis.

Similarly, if the RUVM's signature on any of the error log entries fails to verify, or one or more of the error log entries is missing from the sequence, then the RUVA requests that the RUVM resends the failed error log entry(s). The RUVA attempts to verify the RUVM's signature for a second time. If this second signature verification passes, the system can assume the initial failure was due to data corruption. If the second signature verification fails, then the system can assume the failure is due to tampering or fraud. In such cases, the administrator is alerted and the suspect error log entries are sent to the administrator for analysis.

The Resource Usage Ticket and Event Record

Figure 7A:
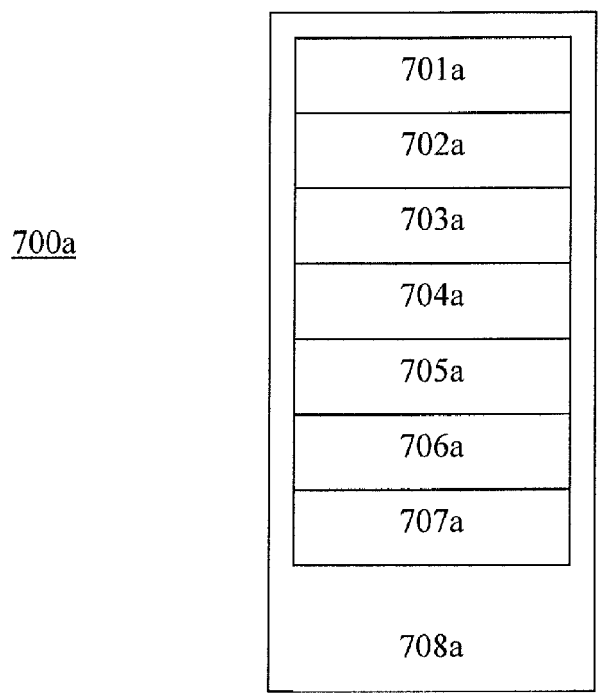
FIGS. 7a and 7b are diagrams depicting exemplary formats of resource usage tickets.

Referring to FIG. 7a, a preferred embodiment of resource usage ticket 700a, as issued by the RUVA, is shown. A randomly generated number 701a prevents a user from issuing false tickets, e.g. from working out the value of the RUVA's key. In addition, it prevents breaches due to replay. The ticket further comprises one or more of a machine ID 702a, file name or ID 703a, site ID 704a, flag 705a, date and time 706a, value field, and second computing device communication flag 707a, which could contain instructions such as, but not limited to: "delete all local copies of signed tickets", or "connect to RUVA now to upload error log", and other information as need. The ticket further comprises the signature of the RUVA 708a.

Figure 7B:
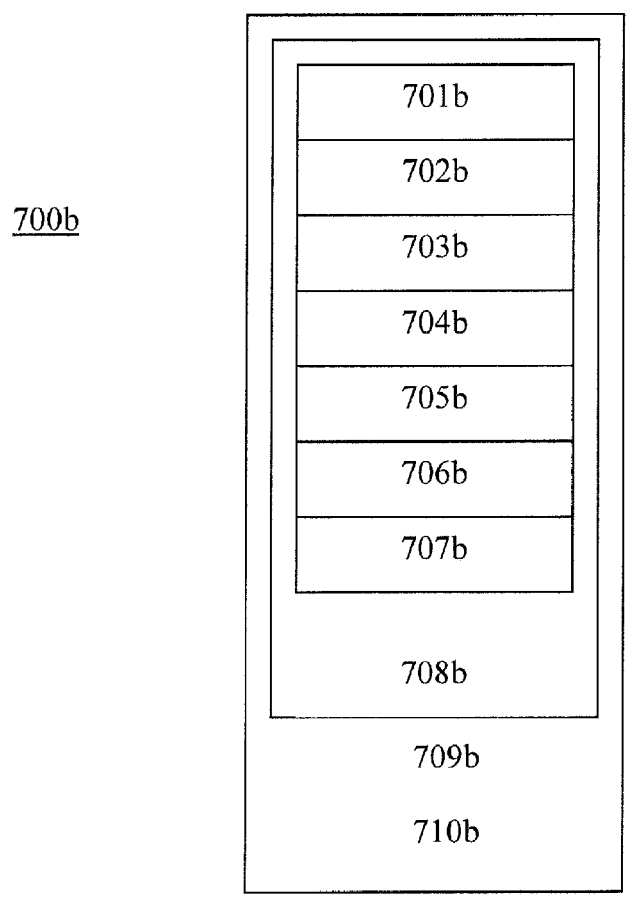

Referring to FIG. 7b, a preferred embodiment of a resource usage ticket 700b, after it has been processed by a second computing device, is shown. A randomly generated number 701b prevents a user from issuing false tickets, e.g. from working out the value of the RUVA's key. In addition, it prevents breaches due to replay. The ticket further comprises a machine ID 702b, file name or ID 703b, site ID 704b, flag 705b, date and time 706b, and second computing device communication flag 707b, which could contain instructions such as, but not limited to: "delete all local copies of signed tickets", or "connect to RUVA now to upload error log". The ticket further comprises the signature of the first computing device's RUVA 708b and the second computing device's RUVA 709b. Because the user's personal signature is not required until a predesignated degree of resource sharing has occurred or time has elapsed, the user's personal signature 710b is optional.

Figure 8:
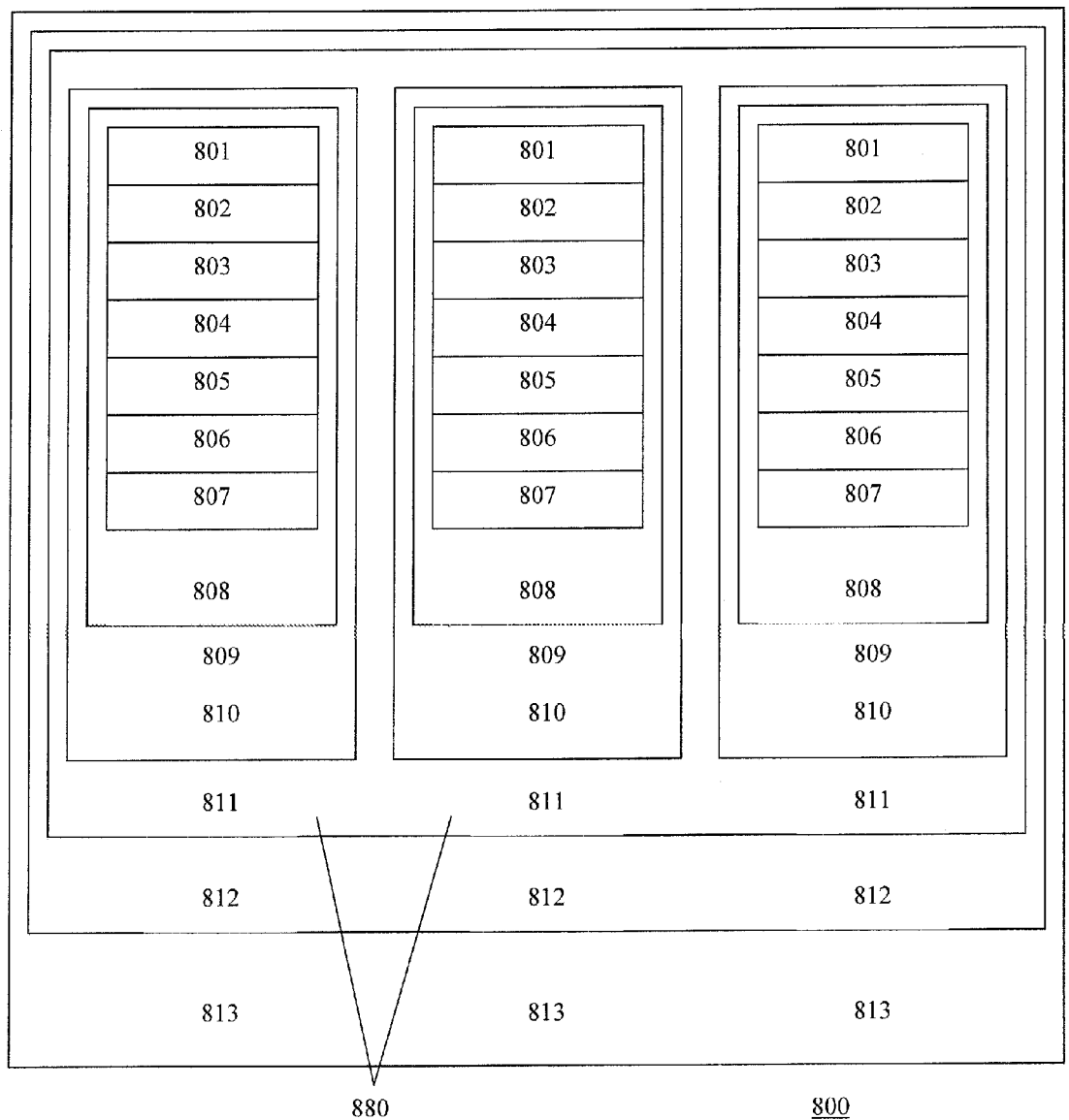
FIG. 8 is a diagram depicting an exemplary format for an event record.
Figure 9:
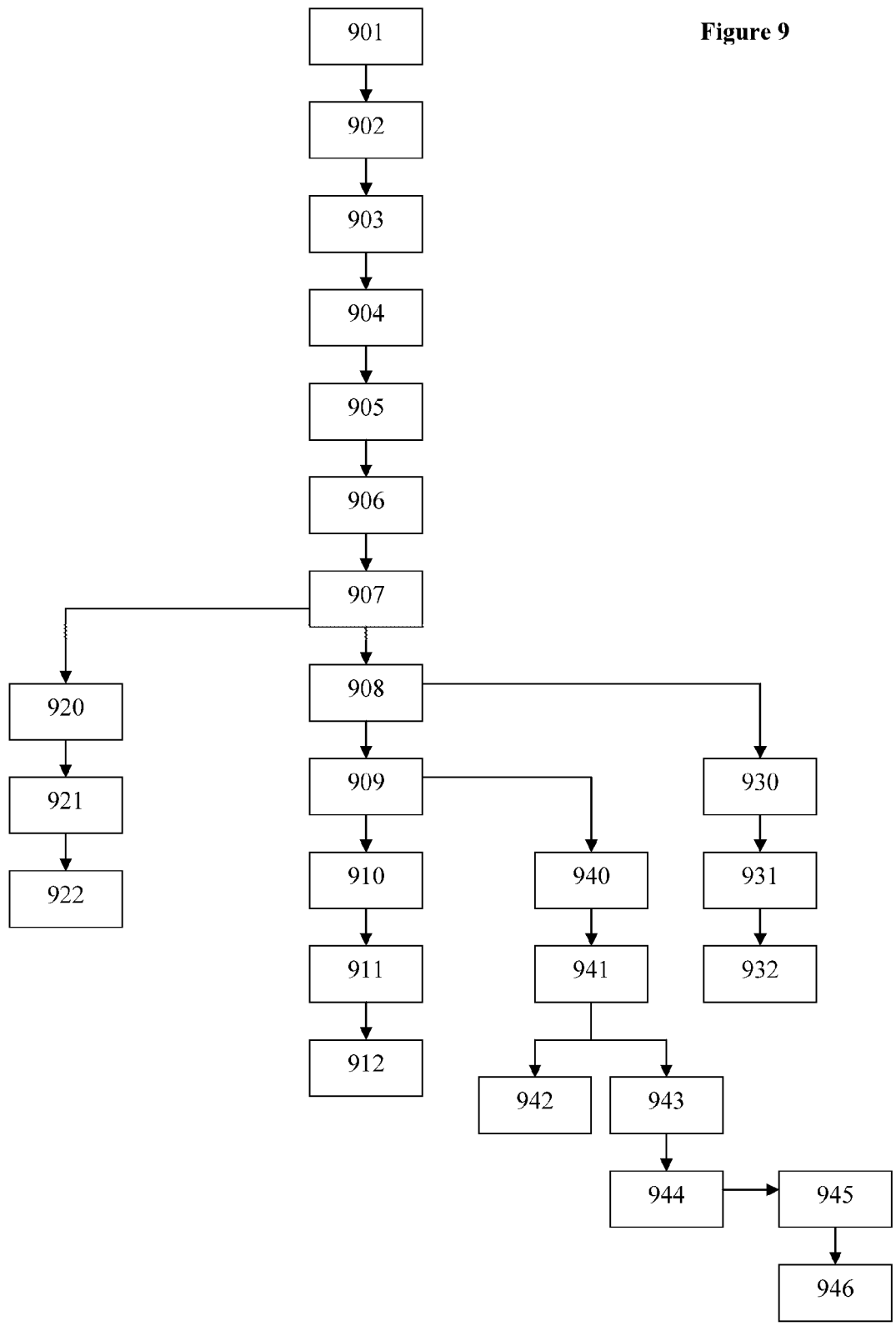
FIG. 9 is a flowchart depicting one embodiment of a process for utilizing value units in the present invention.

The plurality of tickets, once validated and authenticated by the RUVA and RUVM of each computing device involved in the transaction, is organized into an event record by the RUVM on the device that has requested the file or resource. FIG. 8 illustrates an exemplary embodiment of an event record, in which tickets are packaged together by the RUVM. Although only three tickets are depicted, one of ordinary skill in the art would appreciate that any number of tickets could be integrated into an event record.

Each ticket 880 within the event record 800 comprises a randomly generated number 801, a machine ID 802, a file name or ID 803, a site ID 804, a flag 805, a date and time 806, a second computing device communication flag 807, the signature of the first computing device's RUVA 808, and the second computing device's RUVA 809. Optionally, each ticket 880 further comprises the personal signature of the user of the second computing device 810. In the form of a record, the event record 800 further comprises the amount of resources (i.e. number of bytes, degree of processing power, etc.) accessed from the second computing device 811, the machine ID of the first computing device 812, and the signature of the RUVM of the first computing device 813.

The Prevention of Fraud

The present invention is also directed toward issuing value to users for sharing files, or other resources, from their computers. This requires the implementation of a method for measuring the amount of file sharing that users engage in and subsequently transmitting that information to a central server where user accounts can be credited with value, such as points, in an amount that is a function of the amount of resources shared. For example, in a preferred embodiment, user accounts are credited with points proportional to the number of kilobytes of files that have been downloaded from their computing devices.

This system can potentially be a prime target for hackers who might try to either inflate their own point totals or try to cause disruption to the overall system, perhaps by attempting to generate huge numbers of points for all users. This would result in an erroneous increase in the amount of value associated with certain users and enable those users to improperly obtain products or services for resource sharing that never occurred.

Preferably, a plurality of secure connections and keys are used to encrypt and protect data from being viewed, accessed, used or otherwise modified by unauthorized users. In one embodiment, data flowing between the RUVM and the RUVA is SSL encrypted. In another embodiment, data flowing between user machines, and specifically between the RUVMs associated with each of such machines, in the form tickets are encapsulated by a signed and ciphered S/MIME structure, using S/MIME toolkits which are readily available in the art.

In another embodiment, the present invention comprises a plurality of asymmetric keys, including a RUVA authentication key, a RUVM secret authentication key, and the RUVM authentication keys issued to the computing device, in association with its machine ID, as identified and determined by the RUVM. If data communication between the RUVA and RUVM is ciphered, additional asymmetric keys are required, including a RUVA confidentiality key and a RUVM confidentiality key.

The RUVA authentication and confidentiality keys are stored and controlled on a trusted server remote from the computing devices. They should be protected using methods known to those of ordinary skill in the art, including restricting access to the servers, using firewalls, and deploying intrusion detection software. In addition, the keys should be regularly modified to limit the effects of a possible compromise.

The RUVM's authentication and confidentiality key pairs are preferably held within the obfuscated RUVM software and can be further obfuscated using known cryptographic techniques. It is preferred that the RUVM generate keys as close to installation of the ASM as possible and the corresponding certificate should bind these keys to the machine ID of the computing device on which the RUVM is running. All keys in the system should be modified as often as practicable. The symmetric key, used in conjunction with the machine ID and user name to protect RUVM's authentication keys, should also be obfuscated.

The code defining each RUVM needs to be obfuscated in such a way as to prevent anyone from reverse engineering it. For each computing device and, therefore, for each instance of a RUVM, distinct and unique keys and certificates should be issued. Key generation is preferably done at the computing device and the obfuscated key of the RUVM should be used to sign the corresponding certificate request. Preferably, the RUVA establishes the identity of the RUVM each time it communicates with it by, for example, having the RUVA issue a random challenge to the RUVM and having the RUVM sign the response using an embedded private key that has been obfuscated. Also preferably, the RUVM must be capable of identifying the machine on which it is running and provide this information to the RUVA. The RUVM should not generate a signature for any data that has not either been created by the RUVM itself, or signed by the RUVA. The RUVM should, in response to a request from the RUVA, be able to verify that a file has been downloaded to a local drive on the computing device. Finally, the RUVM preferably is capable of recognizing that its certificate is going to expire in a defined period of time, or has already expired, and activating key re-generation and certificate renewal.

One of ordinary skill in the art would appreciate that, in cases where the RUVA is unable to verify the RUVM's signature embodied in the event record, the signatures of the RUVM of the computing device (or the user associated with that computing device) that provided the resource, or the RUVA's signature, various actions can be taken by the system and/or system administrator. Specifically, the system can revoke the certificate of the RUVM associated with the offending computing device, not recognize transactions involving a computing device having a machine ID, not recognize transactions involving a particular user, or refuse to assign value to any transactions involving machine IDs or users who have previously been associated with an excessive number of fraudulent or corrupted tickets.

Use of Value by Users

The present invention discloses methods and systems for awarding value, in the form of points, compensation, rewards, and other benefits, based upon the amount and degree of resource usage made available by a user to a peer-to-peer network. Preferably, the value awarding system is user friendly, whether or not connected to a network, uses minimal server bandwidth by making use of the cache of the browser or peer-to-peer application, and operates using minimal server hits by minimizing the number of distinct files to be downloaded.

As previously discussed, the RUVA uses the event record to assign and allocate value. The RUVA determines the extent of resource use, such as the number of bytes, and the source of the resource, as indicated by the machine ID and then modifies the database record by associating the determined extent of resource use (i.e. the number of bytes) with the resource source, i.e. the machine ID. One of ordinary skill in the art would appreciate that the amount of allocated value can be any function of the extent of resource use. For example, for every 1 megabyte shared by a computing device, the computing device gets awarded 10 value units, 50 value units, 100 value units, 500 value units, 1000 value units or any other value unit total. Preferably, a consistent, linear relationship between the amount of megabytes shared and the amount of value units awarded is maintained.

In turn, the value units can be associated with any type of currency amount. For example, each value unit can equate to ten cents, one dollar, three Euros, or one point if using a private currency system. The value units can also be used to determine whether a user is eligible for certain products, services, or privileges. In that case, the value units measure to what extent the user has satisfied certain threshold requirements for sharing resources. Where the value unit total exceeds a certain threshold, the user is deemed to be eligible to purchase, obtain, or otherwise conduct transactions dealing with certain products or services.

A plurality of embodiments enable users to use accumulated value units. In a first embodiment, a user accesses 901 a web-based service, such as an electronic commerce site, to engage in a transaction. After identifying a product or service the user likes, the user initiates 902 a purchase transaction through any method known in the art, including clicking on a purchase icon or clicking on a "checkout" button. Assuming the purchase details are properly identified and confirmed, the user designates 903 the payment method by activating a drop-down box and selecting a payment scheme. The user selects a payment method representing the value units generated from its resource sharing activities. Such a payment method could be labeled "Points", "Value Units", or any other name or symbol. Accordingly, the user supplies a password to confirm the user's identity and authority to utilize points. One of ordinary skill in the art would appreciate that other conventional e-commerce activities would be included in the process, including identifying a shipping address, identifying payee information, confirming the order, receiving a confirmation number, and receiving a confirmation email.

In the course of the e-commerce transaction, after the designation 903 of the payment method by the user, the e-commerce server responsible for conducting and completing the transaction connects 904 via a web service interface, such as a SOAP/XML interface, to a value unit web server. The e-commerce server submits 905 the user's identifying information, including user's name, address, and password, and also submit the number of points being used in the transaction.

The value unit server receives 906 the information, accesses 906 its database records to: a) determine 907 whether such a user exists, b) if such a user exists, validate 908 whether the person conducting the transaction is authorized to use the points associated with the user, c) and if validated, determine 909 the total number of points the user may access. In one embodiment, the value unit server is able to successfully 910 identify and validate a user and authorize the transaction because the number of points available to the user equals or exceeds the number of points associated with the transaction. The value unit server issues 911 a transaction approval back to the e-commerce server, which completes the transaction, and concurrently authorizes 912 value to be accredited to an account associated with the entity conducting the transaction with the user, i.e. the retailer or e-commerce web site.

In another embodiment, the value unit server is unable to identify 920 a user corresponding to the user name supplied by the e-commerce server. Accordingly, the value unit server returns a response 921 to the e-commerce server indicating that the user is not recognized. The e-commerce server returns 922 a web page to the user indicating that the form of payment identified by the user cannot be used because the user is not recognized. One of ordinary skill in the art would appreciate that the e-commerce system may provide the user with a plurality of options, including trying to use the points again, selecting a different, conventional form of payment, or abandoning the transaction.

In another embodiment, the value unit server is unable to validate 930 whether the user is authorized to access the points of a recognized user. Accordingly, the value unit server returns a response 931 to the e-commerce server indicating that the user is not authorized. The e-commerce server returns 932 a web page to the user indicating that the form of payment identified by the user cannot be used because the user is not authorized to access the points. One of ordinary skill in the art would appreciate that the e-commerce system may provide the user with a plurality of options, including trying to use the points again, selecting a different, conventional form of payment, or abandoning the transaction.

In another embodiment, the value unit server is able to recognize and validate the user but determines 940 that the user does not have a sufficient number of points to complete the transaction. Accordingly, the value unit server can return a response 941 to the e-commerce server indicating that the user does not have a sufficient number of points to complete the transaction. Additionally, the value can include, in that response, a calculation of the number of points available to the user, the number of points required in the transaction, and the differential between the two.

The e-commerce server returns 942 a web page to the user indicating that the form of payment identified by the user cannot be used because the user does not have a sufficient number of points to complete the transaction. One of ordinary skill in the art would appreciate that the e-commerce system may provide the user with a plurality of options, including trying to use the points again, selecting a different, conventional form of payment, or abandoning the transaction.

Alternatively, the e-commerce server can return 943 a web page to the user indicating that the form of payment identified by the user is not sufficient to complete the transaction and that the points must be supplemented with a different currency, including debit cards, credit cards, or some other payment mechanism. After receiving 944 an indication from the user that he would like to complete the transaction by combining another form of currency with the points, the e-commerce server provides 945 the user a balance calculation, indicating the amount of the transaction, the number of points required, the number of points available, the difference between the number of points required and available points, and the currency value of that difference. The e-commerce server then offers 946 the user a plurality of options for paying for the currency value of that difference, including debit cards or credit cards. Upon receiving the user's choice, the e-commerce server initiates a new transaction by resending the user name, authorization information, and points required such that the points required are less than or equal to the number of points available. The value unit server is therefore able to successfully identify and validate a user and authorize the transaction because the number of points available to the user equals or exceeds the number of points associated with the transaction. The value unit server issues a transaction approval back to the e-commerce server, which completes the transaction, and concurrently authorizes value to be accredited to an account associated with the entity conducting the transaction with the user, i.e. the retailer or e-commerce web site.

Figure 11:
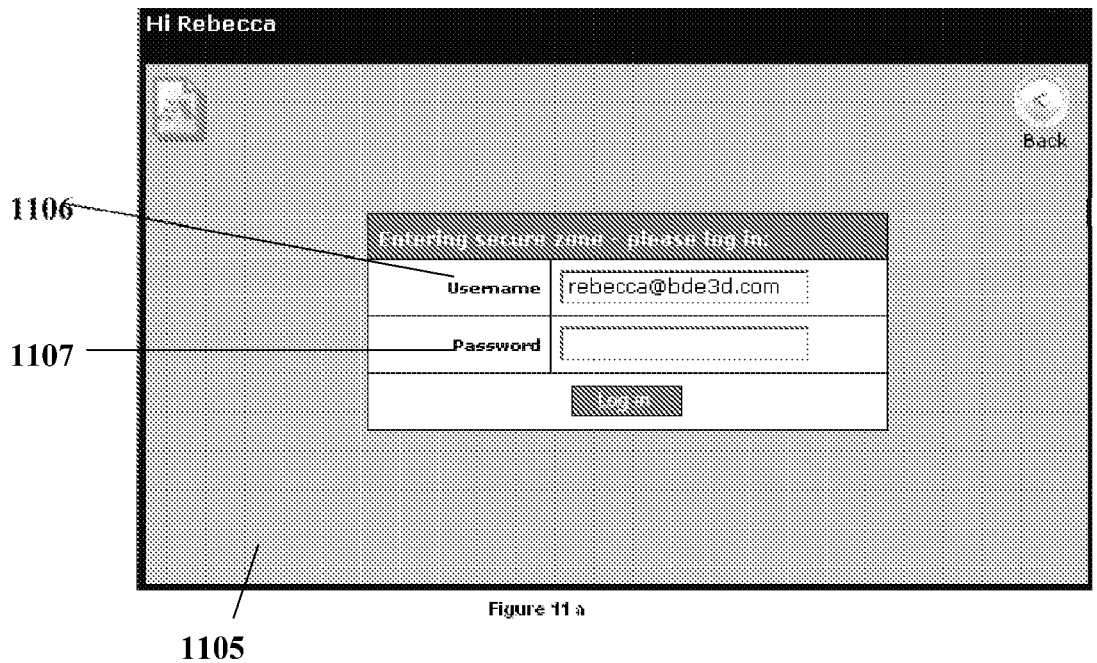
FIGS. 11a through 11d are exemplary interfaces for another embodiment of a process for using value units.
Figure 11:
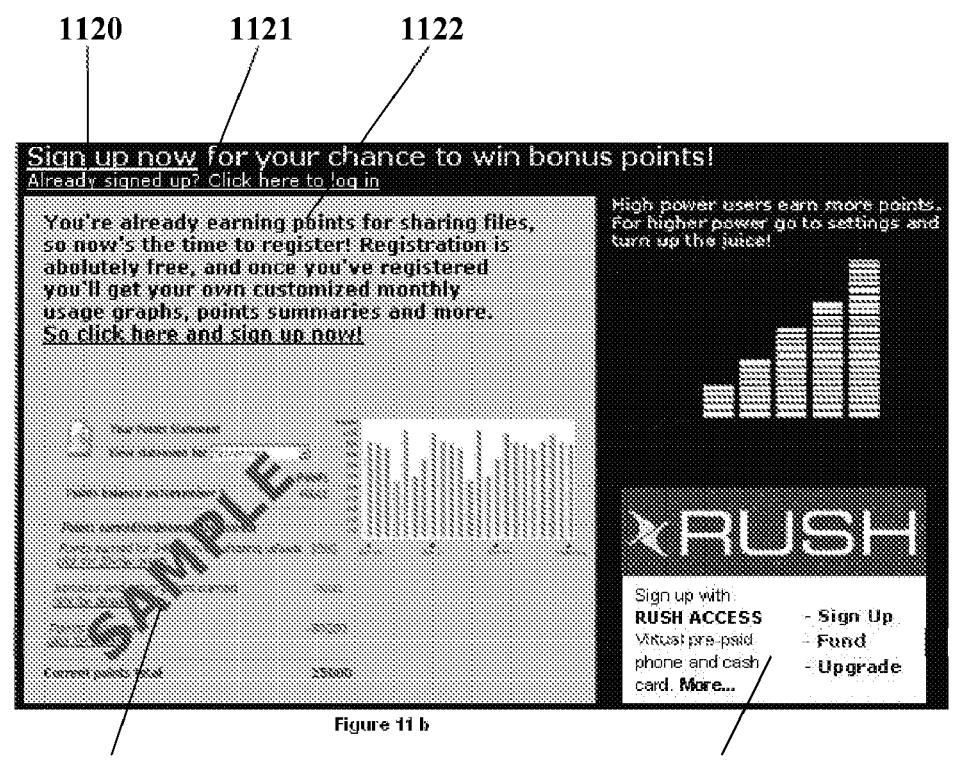
Figure 11:
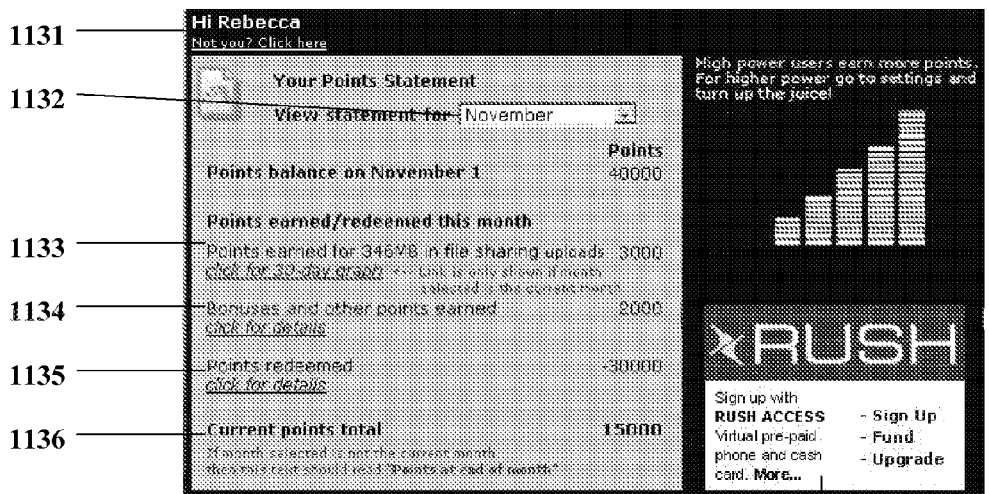
Figure 11:

In another embodiment, the value generated by the user sharing resources with third parties can be accessed through a plurality of interfaces. Referring to FIGS. 11a through 11d, a login screen 1105 is provided wherein a user inputs an identifier 1106, such as a username, and an authorization code 1107, such as a password. If validated, the user receives a summary statement indicating existing value balances, shown in FIG. 11c. In one embodiment, the user has accumulated value without having officially registered with the service. As previously discussed, it is preferred to permit users to accumulate value and not require a user-specific registration process. However, after a period of value accumulation, it is further preferred to offer the user a series of incentives to register and provide user-specific information. As shown in FIG. 11b, an interface provides a plurality of sign up offers 1120, 1122, and sign up incentives 1124 to encourage the user to provide user-specific registration information. The interface further provides a link 1121 to enable registered users to log in and a sample summary of value generated 1123 to educate users on what they could be receiving.

Referring back to FIG. 11c, an exemplary web page 1130 summarizing value accumulation information is shown. The user's name is preferably displayed 1131, along with an option to change the user designation if it is incorrect. The user preferably has an option 1132 for what period of time, defined in terms of months, weeks, quarters, or years, he may view his accumulated value. Once defined, the value generated for that period of time, such as value earned for sharing files 1133 or other activities 1134, is shown, along with any value that has been used 1135. The total point balance 1136 is also preferably displayed.

Referring to FIG. 11d, illustrates an exemplary purchase page 1140 where products may be purchased using value generated by sharing resources. The user's name is preferably displayed 1141, along with an option to change the user designation if it is incorrect and the total number of points available for the user to spend, redeem, or otherwise use. A search interface 1142 is capable of receiving a search designation from the user and, based on that designation, searching for products and services desired by the user. Preferably, that search designation can be narrowed by offering the user a selection 1143 to further refine the search, including options to search all offers, only offers for which the user has enough value, or offers only available in the user's area. One of ordinary skill in the art would appreciate that other narrowing constraints could be used, including time designations (newest offers), brand designations (only name brands), limited time offers (offers only available for a specified period of time), and other such restrictions.

Products and/or services matching the search are preferably displayed in the web page 1140 as well. The display includes a description of the product and/or service 1144, together with a link for obtaining further information, the cost of the product and/or service 1145 in terms of value, i.e. points, and/or currency, i.e. dollars, an option to add the product and/or service to a shopping cart 1146, and an option 1147 to initiate a purchase using value, or a redemption using points.

The compensation system of the present invention can be effectuated using a plurality of other systems and approaches. For example, the web page may display products alphabetically, based upon highest price to lowest price, or grouped by the amount of value required to complete a purchase. The system may further offer various user features, including emailing users when certain items are available or when certain items fall within the value total accumulated by the user; providing users with an on-going balance summary of points, irrespective of where they are in the purchase process; rewarding users for consistent usage of points; or offering special deals to high volume users.

Figure 10:
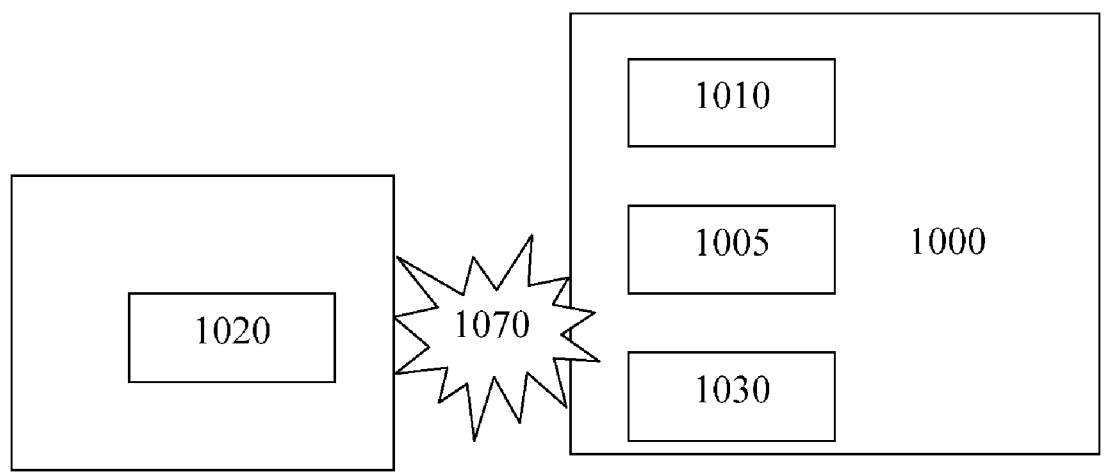
FIG. 10 is a flowchart for one embodiment for measuring CPU usage.

Additionally, as previously discussed, the present invention can also be used to award value to users who make resources other than file sharing available to third parties. For example, the present invention can reward users for making their CPU available for processing tasks. Referring to FIG. 10, one embodiment for metering CPU sharing is shown. The system includes CPU sharing module 1005 and RUVM 1030 on a computing device 1000 communicating over a network 1070 to a server 1020. When the owner of the computing device 1000 starts to share CPU time, the signing module 1030 sends a request for an invoice to server 1020. Server 1020 responds with a signed invoice. The invoice is passed to the controller software or CPU sharing module 1005. CPU sharing module 1005 is responsible for policing the running of local applications 1010. CPU sharing module 1005 calls the application 1010 and measures the time during which the application 1010 is run, i.e. the number of CPU clock cycles etc. When the period of sharing is over, CPU sharing module 1005 updates the invoice with the details of how long the application 1010 was run and signs it before passing it back to the signing module 1030 which signs and transmits the invoice back to the server 1020. The server 1020 is responsible for assigning and tracking value accumulated in accordance with signed invoices. Users can then use the accumulated value in accordance with previously described approaches.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A computer-implemented method of allocating compensation or rewards based on resources provided to a first computing device by a second computing device in a distributed network, said first computing device being in data communication with a first trusted entity, and said second computing device being in data communication with a second trusted entity, said first trusted entity and said second trusted entity being in data communication with a resource usage verification authority, said method comprising the steps of:

(A) said resource usage verification authority receiving, from the first trusted entity, information about an intended resource use on behalf of said first computing device, wherein said intended resource usage relates to a transaction for downloading a file to said first computing device;

(B) said resource usage verification authority conducting a redundancy check for said transaction to determine whether said transaction has previously been performed or requested, in whole or in part, on behalf of said first computing device;

(C) based at least in part on said redundancy check, said resource usage verification authority setting a weighting factor for said transaction, said weighting factor indicating an extent value should be awarded for the transaction, wherein, when said transaction is determined by said redundancy check to be redundant, the weighting factor is set to a value that indicates that any compensation or reward associated with the transaction should be given less than full weight;

(D) said resource usage verification authority issuing a ticket, the ticket including an indication of said weighting factor for said transaction;

(E) said second trusted entity modifying the ticket to produce a modified ticket, said modified ticket being based at least in part upon actual resources provided by said second computing device to said first computing device related to said transaction, said modified ticket including details regarding resources shared by the second computing device in connection with said transaction;

(F) said resource usage verification authority utilizing said ticket and said modified ticket to determine the extent of resources provided by the second computing device to the first computing device related to said transaction; and (G) allocating compensation or rewards related to the transaction to said second user based at least in part on:
   (a) said indication of said weighting factor for the transaction, and
   (b) the determined extent of resources provided by the second computing device related to said transaction.

2. The method of claim 1 wherein the resources provided by the second computing device related to said transaction include at least one of provision of bandwidth, provision of CPU cycles, and provision of disk or memory storage.

3. The method of claim 1 wherein the ticket comprises at least one of a machine identification field, a field for a file name for the file, a field for a hash of the file, a field for a randomly generated number, a weighting field for said indication of said weighting factor, a time field, a value field, and a date field.

4. The method of claim 1 wherein the first computing device is operated by a first user and wherein the second computing device is operated by a second user.

5. The method of claim 1 wherein the redundancy check comprises determining one or more of:
   (a) whether said file has already been downloaded, in whole or in part, to said first computing device,
   (b) whether said file has been previously requested by said first computing device, and
   (c) whether a resource usage ticket has already been issued for downloading the same file to the first computing device.

6. The method of claim 1 further comprising said first trusted entity validating the ticket.

7. The method of claim 1 further comprising:
authenticating the identity of the first trusted entity prior to issuing said ticket.

8. The method of claim 1 wherein said first trusted entity is a module incorporating authentication, encryption or data signing capabilities in data communication with a computing device.

9. The method of claim 7 wherein the first trusted entity comprises a receipt request generator, receipt generator module, and receipt validation module.

10. The method of claim 1 wherein the step of modifying the ticket by the second trusted entity comprises adding details of the extent of resources shared by the second computing device for said transaction, said details including at least one of:
the time taken to transfer the file from the second computing device to the first computing device, and
the amount of data transferred from the second computing device to the first computing device as part of said transaction.

11. The method of claim 1 wherein said redundancy check comprises
a check that the transaction has not been repeated.

12. The method of claim 1 wherein the redundancy check is performed prior to providing said ticket.

13. The method of claim 1 wherein the network comprises a peer-to-peer network.

14. The method of claim 13 wherein the first computing device further comprises a peer-to-peer client application.

15. The method of claim 14 wherein the first trusted entity is integrated into the peer-to-peer client application.

16. A computer-implemented method of measuring the extent of resources provided to a first computing device by a second computing device in a distributed network, said first computing device being in data communication with a first trusted entity, and said second computing device being in data communication with a second trusted entity, said method comprising the steps of:

(A) a server receiving, from the first trusted entity, information about an intended resource use on behalf of said first computing device, wherein said intended resource usage relates to a transaction for downloading a file to said first computing device;

(B) said server conducting a redundancy check for said transaction to determine whether said transaction has previously been performed or requested, in whole or in part, on behalf of said first computing device;

(C) based at least in part on said redundancy check, said server setting a weighting factor for said transaction, said weighting factor indicating an extent value should be awarded for the transaction, wherein, when said transaction is determined by said redundancy check to be redundant, the weighting factor is set to a value that indicates that any compensation or reward associated with the transaction should be given less than full weight;

(D) said server issuing a ticket to the first trusted entity, the ticket including an indication of said weighting factor for said transaction;

(E) the second trusted entity modifying the ticket to produce a modified ticket, said modified ticket being based at least in part upon actual resources provided by said second computing device to said first computing device related to said transaction, said modified ticket including details regarding resources shared by the second computing device in connection with said transaction;

(F) said server utilizing said ticket and said modified ticket to determine the extent of resources provided by the second computing device to the first computing device related to said transaction; and (G) allocating compensation or rewards related to the transaction to said second user based at least in part on:
   (a) said indication of said weighting factor for the transaction, and
   (b) the determined extent of resources provided by the second computing device related to said transaction.

17. The method of claim 16 wherein the ticket is issued by a server distinct from the first computing device and the second computing device.

18. The method of claim 17 wherein the server is a resource usage verification authority (RUVA) server.

19. The method of claim 18 wherein, in step (A), the information is received at the RUVA from the first trusted entity, and wherein, in step (B), the redundancy check is conducted by the RUVA; and wherein, in step (C), the weighting factor is set by the RUVA; and wherein, in step (D), the ticket is provided to the first trusted entity by the RUVA; and wherein, in step (F) the RUVA determines the extent of resources provided by the second computing device to the first computing device related to said transaction.

20. The method of claim 19 wherein the second trusted entity obtains the ticket from the first trusted entity.

21. The method of claim 16 wherein the details include at least:
  (i) the time taken to transfer the file from the second computing device to the first computing device, and
  (ii) the amount of data transferred from the second computing device to the first computing device as part of said transaction.

22. A computer-implemented method of allocating compensation or rewards based on resources provided to a first computing device by a second computing device in a distributed network, said first computing device being in data communication with a first trusted entity, and said second computing device being in data communication with a second trusted entity, said first trusted entity and said second trusted entity being in data communication with a resource usage verification authority, said method comprising the steps of:
  (A) said resource usage verification authority receiving, from the first trusted entity, information about an intended resource use on behalf of said first computing device, wherein said intended resource usage relates to a transaction for downloading a file to said first computing device;
  (B) said resource usage verification authority conducting a redundancy check for said transaction to determine whether said transaction has previously been performed or requested, in whole or in part, on behalf of said first computing device;
  (C) based at least in part on said redundancy check, said resource usage verification authority setting a weighting factor for said transaction, said weighting factor indicating an extent value should be awarded for the transaction, wherein, when said transaction is determined by said redundancy check to be redundant, the weighting factor is set to a value that indicates that any compensation or reward associated with the transaction should be given less than full weight;
  (D) said resource usage verification authority issuing a ticket, the ticket including an indication of said weighting factor for said transaction;
  (E) said second trusted entity modifying the ticket to produce a modified ticket, said modified ticket being based at least in part upon actual resources provided by said second computing device to said first computing device related to said transaction, wherein the step of modifying (E) comprises adding details of the extent of resources shared by the second computing device for said transaction;
  (F) said resource usage verification authority utilizing said ticket and said modified ticket to determine the extent of resources provided by the second computing device to the first computing device related to said transaction; and
  (G) allocating compensation or rewards related to the transaction to said second user based at least in part on:
    (a) said indication of said weighting factor for the transaction, and
    (b) the determined extent of resources provided by the second computing device related to said transaction.

23. The method of claim 22 wherein the details include at least one of: (i) the time taken to transfer the file from the second computing device to the first computing device, and (i) the amount of data transferred from the second computing device to the first computing device as part of said transaction.

* * * * *